(12) United States Patent
Foley et al.

(10) Patent No.: US 11,570,303 B2
(45) Date of Patent: Jan. 31, 2023

(54) MANAGING TELEPHONE BASED CHANNEL COMMUNICATION IN A GROUP-BASED COMMUNICATION SYSTEM

(71) Applicant: Salesforce, Inc., San Francisco, CA (US)

(72) Inventors: Devin Foley, Alameda, CA (US); Jeremy Apthorp, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/938,751

(22) Filed: Jul. 24, 2020

(65) Prior Publication Data

US 2021/0029245 A1 Jan. 28, 2021

Related U.S. Application Data

(60) Provisional application No. 62/879,175, filed on Jul. 26, 2019.

(51) Int. Cl.
*H04L 65/403* (2022.01)
*H04L 12/18* (2006.01)
(Continued)

(52) U.S. Cl.
CPC .......... *H04M 3/5175* (2013.01); *H04L 67/10* (2013.01); *H04M 3/42059* (2013.01); *H04M 3/5183* (2013.01); *H04M 7/006* (2013.01)

(58) Field of Classification Search
CPC ............... H04L 65/403; H04L 12/1822; H04L 12/1831; H04L 47/70; H04L 63/10;
(Continued)

(56) References Cited

U.S. PATENT DOCUMENTS 8,155,622 B1 * 4/2012 Moshenberg ....... H04W 12/084
455/410
2012/0330976 A1 * 12/2012 Tsuchida ............... G06F 40/157
707/749
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Kharye Pope
(74) *Attorney, Agent, or Firm* — Lee & Hayes, P.C.

(57) ABSTRACT

Techniques for facilitating messaging in a group-based communication system between a calling device and one or more client devices. A first user operating a calling device may send a request to a call server computing device to send a call-based communication via the group-based communication system. The call-based communication may include voice or textual data. The call server computing device may receive the call-based communication and may format the call-based communication to send to the group-based communication system. The call server may send the formatted call-based communication to the group-based communication system for presentation via the one or more client devices.

20 Claims, 14 Drawing Sheets

(51) Int. Cl.
*H04L 47/70* (2022.01)
*H04M 3/51* (2006.01)
*H04L 67/10* (2022.01)
*H04M 7/00* (2006.01)
*H04M 3/42* (2006.01)

(58) Field of Classification Search
CPC ..... H04L 51/36; H04L 51/046; H04L 63/101; H04L 65/4015; H04L 67/22; H04L 12/1827; H04L 51/18; H04L 51/24; H04L 63/20; H04L 12/1818; H04L 51/04; H04L 51/16; H04L 51/32; H04L 65/1096; H04L 12/1813; H04L 12/1895; H04L 51/02; H04L 51/10; H04L 67/10; H04L 12/1859; H04L 51/00; H04L 51/043; H04L 51/38; H04L 63/102; H04L 63/104; H04L 65/1089; H04L 67/306; H04M 2250/62; H04M 1/72436; H04M 1/72469; H04M 2201/38; H04M 2203/2038; H04M 3/564; H04M 7/0027; H04M 3/567; H04M 1/2535; H04M 2201/50; G10L 15/26; G10L 17/00; G10L 13/00; G10L 15/1822; H04W 4/08; H04W 68/005; H04W 4/02; G06F 16/245; G06F 16/24575; G06F 40/00; G06F 21/31; G06F 16/248; G06F 16/9535

See application file for complete search history.

(56) References Cited

U.S. PATENT DOCUMENTS

| | | | |
|---|---|---|---|
| 2013/0058471 A1* | 3/2013 | Garcia | H04M 3/42221 379/202.01 |
| 2013/0144951 A1* | 6/2013 | Viswanath | H04L 67/2823 709/204 |
| 2014/0188990 A1* | 7/2014 | Fulks | H04L 65/1069 709/204 |
| 2014/0335831 A1* | 11/2014 | Lamberton | H04W 12/126 455/411 |
| 2015/0100503 A1* | 4/2015 | Lobo | G06Q 10/103 705/301 |
| 2016/0255139 A1* | 9/2016 | Rathod | H04L 51/046 709/203 |
| 2016/0337213 A1* | 11/2016 | Deutsch | H04L 65/4069 |
| 2017/0237855 A1* | 8/2017 | Patil | H04L 67/306 455/414.1 |
| 2017/0279906 A1* | 9/2017 | Laird-McConnell | H04L 51/02 |
| 2017/0353510 A1* | 12/2017 | Levine | H04M 3/18 |
| 2018/0115877 A1* | 4/2018 | Riker | H04W 4/029 |
| 2018/0123814 A1* | 5/2018 | Sexauer | H04L 51/04 |
| 2018/0249384 A1* | 8/2018 | Chami | H04W 48/02 |
| 2018/0287982 A1 | 10/2018 | Draeger et al. | |
| 2020/0211408 A1* | 7/2020 | Faulkner | G09B 7/02 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2 013, 4:15 PM) 3 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019], Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9Md7d-9573-89d9598a4963/?context=1000516>(dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—a New Communication System Based on Awareness and Text Communications", FUJITSU Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.cxt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83//8c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

300 ─▶

```
┌─────────────────────────────────────────────────────────────────┐
│ RECEIVE, FROM A CALLING DEVICE ASSOCIATED WITH A FIRST USER, A  │
│ REQUEST TO SEND A CALL-BASED COMMUNICATION VIA A COMMUNICATION  │
│             CHANNEL OF A COMMUNICATION PLATFORM                 │
│                              310                                │
└─────────────────────────────────────────────────────────────────┘
                                │
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  IDENTIFY A COMMUNICATION CHANNEL IDENTIFIER BASED AT LEAST IN PART
│                       ON THE REQUEST                            │
                              320
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                │
                                ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  EXTRACT CALL-BASED COMMUNICATION METADATA BASED AT LEAST IN PART
│                       ON THE REQUEST                            │
                              330
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                │
                                ▼
┌─────────────────────────────────────────────────────────────────┐
│ GENERATE AN ACTION EVENT DATA STRUCTURE BASED AT LEAST IN PART ON│
│                          THE REQUEST                            │
│                              340                                │
└─────────────────────────────────────────────────────────────────┘
                                │
                                ▼
┌─────────────────────────────────────────────────────────────────┐
│  GENERATE ONE OR MORE CALL OBJECTS BASED AT LEAST IN PART ON THE │
│   COMMUNICATION CHANNEL AND THE ACTION EVENT DATA STRUCTURE     │
│                              350                                │
└─────────────────────────────────────────────────────────────────┘
                                │
                                ▼
┌─────────────────────────────────────────────────────────────────┐
│  SEND THE ONE OR MORE CALL OBJECTS TO A GROUP-BASED             │
│  COMMUNICATION SERVER COMPUTING DEVICE ASSOCIATED WITH THE      │
│                  COMMUNICATION PLATFORM                         │
│                              360                                │
└─────────────────────────────────────────────────────────────────┘
```

FIG. 3A

MANAGING TELEPHONE BASED CHANNEL COMMUNICATION IN A GROUP-BASED COMMUNICATION SYSTEM

PRIORITY

This application is a continuation of and claims the benefit of priority to U.S. Provisional Patent Application Ser. No. 62/879,175, filed Jul. 26, 2019 and entitled "Managing Telephone Based Channel Communication in a Group-Based Communication System," the entire contents of which are incorporated herein by reference.

BACKGROUND

Various servers may support communications between client devices and a communication system. Applicant has identified a number of deficiencies and problems associated with collaborative communication environments. Through applied effort, ingenuity, and innovation, many of these identified problems have been solved by developing solutions that are included in examples of the present disclosure, many examples of which are described in detail herein.

BRIEF DESCRIPTION OF THE DRAWINGS

The detailed description is described with reference to the accompanying figures, which are not necessarily drawn to scale. In the figures, the left-most digit(s) of a reference number identifies the figure in which the reference number first appears. The use of the same reference numbers in different figures indicates similar or identical components or features.

FIGS. 3A-3F are example flowcharts illustrating the functionality of various computing entities according to various examples of the present disclosure.

DETAILED DESCRIPTION

Figure 1A:
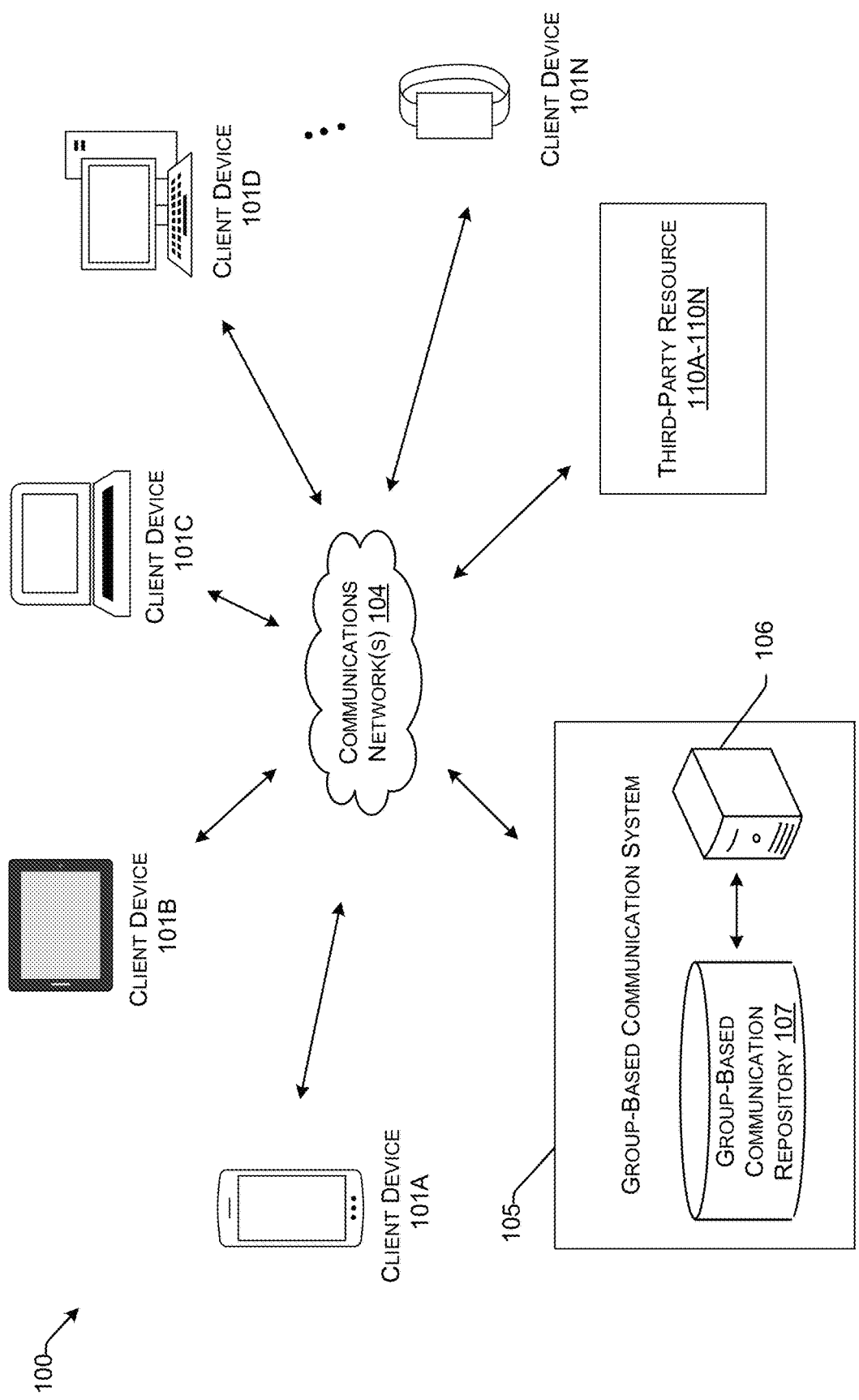
FIG. 1A shows a schematic view of a group-based communication platform in communication with client devices according to one example of the present disclosure.

This application describes techniques for programmatically managing call-based channel communications between a group-based communication system and a calling device. A user operating a calling device may send a request to a call server computing device to send a message via the group-based communication system. The user may or may not be associated with the group-based communication system. The message may include voice or textual data. The call server computing device may receive the message and may format the message for publication via the group-based communication system. The call server may send the formatted message to the group-based communication system for publication via the one or more client devices.

Group-based communication system users may be organized into organization groups (e.g., employees of each company may be a separate organization group) and each organization group may include one or more group-based communication channels to which users may be assigned or which the users may join (e.g., group-based communication channels may represent departments, geographic locations such as offices, product lines, user interests, topics, issues, and/or the like). In some examples, a group-based communication system is a channel-based messaging platform. Registered group-based communication system users who access group-based communication system using a group-based communication interface may be able to participate in the discussions occurring in the one or more group-based communication channels.

However, sometimes it may be desirable to give some users who are not registered group-based communication system users, and therefore may not access the group-based communication system via a group-based communication interface, limited access to the group-based communication system. Therefore, an alternative protocol to interact with the group-based communication system, such as call-based communication, may be needed. In addition, some registered users may use such call-based communication to interact with the group-based communication system in circumstances where the group-based communication interface is not available to the user.

The techniques described herein may provide an improvement to existing group-based communication systems by enabling call-based messaging. The call-based messaging described herein provides a means for ensuring efficient computing resource usage, efficient network bandwidth usage, security, and user engagement experience of the group-based communication system. For example, without an efficient mechanism for managing call-based communication, a group-based communication system may transmit data included in call-based communications to too many client devices or accept call-based communication too frequently, resulting in inefficient computing resource and network bandwidth usage due to an increase in network transmissions. As such, the techniques described herein may improve the functioning of various computing devices associated with the group-based communication system and may decrease a total amount of content sent over a network, thereby increasing an amount of network bandwidth available for other uses.

In some examples, a group-based communication system may transmit data included in call-based communications to too few client devices or accept call-based communication too infrequently, resulting in potentially poor engagement with call-based communication. This poor engagement with call-based communication may result in a need for potential retransmission of data included in call-based communications. Such inefficient computing resource and network bandwidth usage may interfere with other operations of the group-based communication system, which, in turn, lowers operational and computational stability of the group-based communication system.

The techniques described herein provide a mechanism for managing integration of such call-based communications to the group-based communication interface. As such, the techniques described herein improve the overall operational and computational stability of the group-based communication system.

It should be understood that some, but not all examples are shown and described herein. Indeed, the examples may take many different forms, and accordingly this disclosure should not be construed as limited to the examples set forth herein. Rather, these examples are provided so that this disclosure will satisfy applicable legal requirements.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1A illustrates an example computing system 100 within which examples of the present disclosure may operate. Users may access a group-based communication system 105 (e.g., communication platform that facilitates communication and interaction between users in a group-based setting) via a communications network 104 using client devices 101A-101N. As used herein, the term group-based refers to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity (e.g., user) who has not been granted access to the group.

The users associated with the group-based based communication system may be organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

The users associated with the group-based communication system 105 may join group-based communication channels (e.g., communication channels). As used herein, the term communication channel refers to a virtual communications environment or feed that may be configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (e.g., messaging communications) will be displayed to each member of the group-based communication channel. For instance, a common set of group-based messaging communications will be displayed to each member of the respective group-based communication channel such that the content of the communication channel (i.e., messaging communications) will not vary per member of the communication channel.

Some communication channels may be globally accessible to those users having a particular organizational group identifier associated with their user profile (i.e., users who are members of the organization). Access to some communication channels may be restricted to members of specified groups, whereby the communication channels are accessible to those users having a particular group identifier associated with their user profile. Each communication channel may have associated therewith a group-based communication channel identifier (e.g., communication channel identifier), which may include a unique identifier associated with a particular communication channel. The communication channel identifier may be used to facilitate access control for a message (e.g., access to the message, such as having the message return as part of search results in response to a search query, may be restricted to those users having the communication channel identifier associated with their user profile, or who have the ability to join the communication channel). The communication channel identifier may be used to determine context for the message (e.g., a description of the communication channel, such as a description of a project discussed in the communication channel, may be associated with the communication channel identifier).

The group-based communication system 105 may comprise a group-based communication server 106 in communication with at least one group-based communication repository 107. The group-based communication server 106 may include a software platform and associated hardware that may be configured to manage access to various group-based communication interfaces of the group-based communication system 105. The group-based communication server 106 may be configured to access, maintain, and support application product logic of the group-based communication system and to access one or more data repositories such as a group-based communication repository 107.

The group-based communication repository 107 may include a computing location where data is stored, accessed, modified, and otherwise maintained by the communication platform. The stored data may include information that facilitates the operation of the communication platform. The group-based communication repository 107 may be embodied as a data storage device or devices, as a separate database server or servers, or as a combination of data storage devices and separate database servers. Further, in some examples, the group-based communication repository 107 may be embodied as a distributed repository such that some of the stored data is stored centrally in a location within the group-based communication system and other data stored in a single remote location or a plurality of remote locations. Alternatively, in some examples, the group-based communication repository 107 may be distributed over a plurality of remote storage locations.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, such as those transmitted over one or more communications networks 104.

A communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some examples, the protocol is a custom protocol of JSON (JavaScript Object Notation) objects sent via a Websocket channel. In some examples, the protocol is JSON over RPC ("remote procedure call"), JSON over REST ("Representational State Transfer")/HTTP ("HyperText Transfer Protocol"), and the like.

The group-based communication server 106 may be embodied as a computer or computers. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The client devices 101A-101N may include computer hardware and/or software that may be configured to access a service made available by a server (e.g., group-based communication server 106). The client devices 101A-101N may include, but are not limited to: smart phones, tablet computers, laptop computers, wearables, personal computers, enterprise computers, and the like. Electronic data received by the group-based communication server 106 from the client devices 101A-101N may be provided in various forms and via various methods.

In various examples, one or more client devices 101A-101N may be associated with a user of the group-based communication system 105. The association may be created by way of the client device transmitting registration information for the user to a group-based communication system 105. In some instances, a client device 101A-101N may be temporarily associated with a user (e.g., only when a user is logged onto the group-based communication system app). In such examples, the group-based communication system 105 may receive registration information indicating the user is associated with a client device 101A-101N (e.g., a user may input a serial number of the client device to be associated with the user into the group-based communication system 105).

In various examples, the client devices 101A-101N may be configured to generate geographic location data and/or contextual location data. The term geographic location data refers to location data (e.g., latitude and longitude coordinates) that is generated by a global positioning system (GPS) receiver housed within the client device 101A-101N. The GPS receiver receives clock data transmitted by one or more geostationary satellites (e.g., a satellite in a known or knowable position) and/or one or more ground based transmitters (e.g., also in known or knowable positions), compares the received clock data, and computes the geographic location data, which represents a near real-time position for the client device 101A-101N. The term contextual location data refers to position or location information that is derived by the client device 101A-101N (or by separate server) based on interactions between the client device 101A-101N and local networks 104, objects, or devices. Example contextual location data could be derived based on reference to known locations for Wi-Fi routers or Bluetooth devices that are configured to communicate with a client device 101A-101N. A client device 101A-101N may also generate contextual location information based on communicating with radio-frequency identification (RFID) readers or tags, or barcode readers or tags, having known positions.

In examples in which a client device 101A-101N is a mobile device, such as a smartphone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

The third-party resource(s) 110A-110N may be remote networked devices, such as a server or processing device, maintained by a third party, and configured to provide third party resources integrated in the group-based communication system 105 for access by the client devices 101A-101N. The client devices 101A-101N can communicate with the third-party resource(s) 110A-110N via the communication network 104. A third-party resource 110A-110N may include a third-party application or computing resource that may be integrated in a group-based communication channel within a group-based communication system 105 and may be accessed by a client device 101A-101N accessing the group-based communication channel. For example, a third-party resource 110A-110N may be a Software as a Service (SaaS) product or an Application (App) product that is provided by a third-party resource provider (e.g., provider of a third-party resource by way of a remote networked device, such as a server or processing device, maintained by a third-party individual, company, or organization) and integrated in a group-based communication system 105. In such an example, a client device accessing the group-based communication system may access the SaaS or App product via a group-based communication channel that a user of the client device is associated with.

In some examples of an exemplary group-based communication system 105, a message or messaging communication may be sent from a client device 101A-101N to a group-based communication system 105. In various examples, the message or messaging communication may have associated therewith a timestamp. The timestamp may represent a network time associated with receipt of the message or messaging communication by the communication platform. In various examples, the timestamp may be analyzed to determine context regarding the message or messaging communication (e.g., the exact moment at which the message was sent in a communication channel). In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one example, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL
<digital_cert_link>www.mydigitalcertificate.com/
JohnDoeDaDoeDoe@gmail.com/mycertifcate.dc</digital_cert_link>
            //OPTIONAL
<digital_certificate>_DATA_</digital_certificate>
        </user_account credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID
>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like
Mac OS X) AppleWebKit/537.51.2 (KHTML, like Gecko) Version/7.0
Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID
>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us;
```

```
Nexus S Build/IMM76D) AppleWebKit/534.30 (KHTML, like Gecko)
Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identified
        <contents>That is an interesting invention. I have attached a copy our
patent policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier (e.g., unique identifier associated with a group including one or more users of the group-based communication platform), a group-based communication channel identifier (e.g., unique identifier associated with a communication channel managed by the group-based communication platform), a sending user identifier, topics, responses, message contents, attachments, message hierarchy data, third party metadata, conversation primitive identifier data, and/or the like. Any one or more of the identifiers may include American Standard Code for Information Interchange (ASCII) text, a pointer, a memory address, and the like, to uniquely identify the associated structure (e.g., group, channel, user(s), etc.). For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identified
    <channel_identifier>ID_channel_1</channel_identified
    <sending_user_identifier>ID_user_1</sending_user_identifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy our patent
policy.</contents>
    <attachments>patent_policy.pdf</attachments>
    <conversation_primitive>
        conversation includes messages: ID_message_8, ID_message_9,
```

```
ID_message_10,
    ID_message_11, ID_message_12
  </conversation_primitive>
</storage_message>
```

In some examples, a group identifier as defined above may be associated with the message.

In some examples, a group-based communication channel identifier as defined above may be associated with the message.

In some examples, a sending user identifier (e.g., unique identifier associated with the user who transmitted the message) may be associated with the message. In one implementation, the message may be parsed (e.g., using PHP—i.e. the script language derived from Personal Home Page Tools—commands) to determine a sending user identifier of the user who sent the message.

In some examples, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive identifier) or parsed using a machine learning technique, such as topic modeling, to determine topics associated with the message.

In some examples, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT                 messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some examples, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some examples, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some examples, a conversation primitive may be associated with the message. In one implementation, a conversation primitive is an element used to analyze, index, store, and/or perform other functions with respect to messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages. The message send order proximity may represent a proximity measure for messages associated with the same channel identifier determined based on number of messages with the same channel identifier with time stamp data between two or more communication messages in the same group-based communication channel. In one example, if a user sends communication message A in a particular group-based communication channel and another user sends communication message B in the same channel before any other communication message is posted in the channel, message A and message B would be determined to have message send order proximity of 1 which indicates highest possible proximity in this example. The message send time proximity may represent a proximity measure determined based on difference of time in time stamp data associated with two or more communication messages in the same group-based communication channel. In one example, if a user sends communication message A in a particular group-based communication channel at 19:02:35 and another user sends communication message B in the same channel at 19:02:40, message A and message B would be determined to have message send time proximity of 5 seconds.

In some examples, various metadata, determined as described above, and/or the contents of the message may be used to index the message (e.g., using the conversation primitive identifier) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one example, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one example, the files may be indexed such that a company's or a group's files are indexed at a separate distributed repository.

Figure 1B:
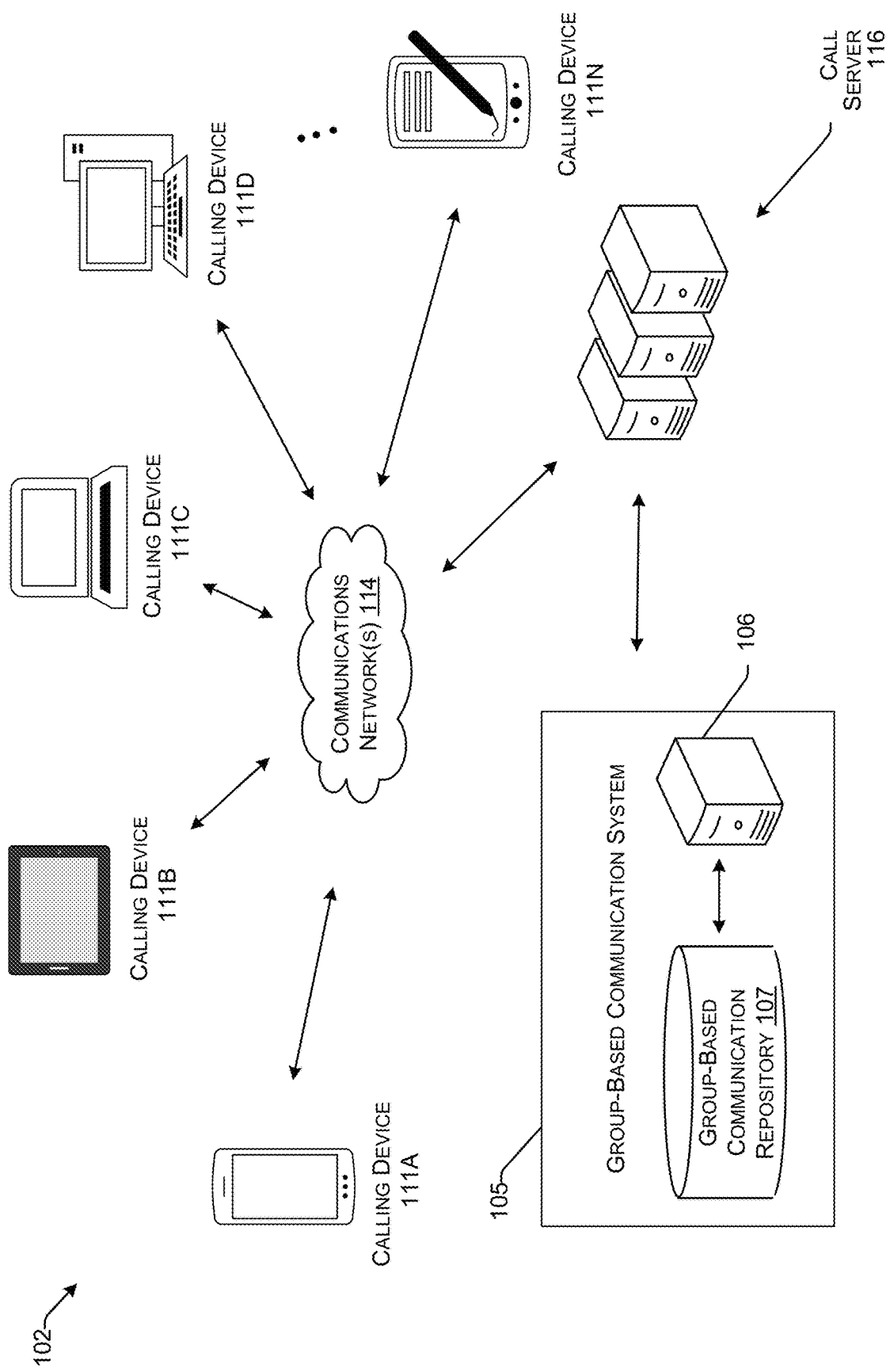
FIG. 1B shows a schematic view of a group-based communication platform in communication with calling devices via a call server according to one example of the present disclosure.

FIG. 1B illustrates an example computing system 102 within which examples of the present disclosure may operate. Users may establish call-based channel communication with a group-based communication system 105 via a communications network 114 and a call server 116 using calling devices 111A-111N. The calling devices 111A-111N may include computer hardware and/or software that may be configured to initiate a call-based or call-based channel communication (e.g., message originating from a calling device 111A-111N) to the call server 116 to engage with a group-based communication system 105 associated with the call server. In some examples, a calling device may be a telephone device. As contemplated herein, the calling device (e.g., telephone device) may include a cellular (e.g., mobile) phone, a smart device, a traditional telephone (e.g., operable via a land line), a tablet, a computer, a laptop, glasses, wearable devices, or any other computing device that supports calling and/or text message (e.g., short message system (SMS) message) capabilities, such as via a telephone network, voice over internet protocol (VoIP), an internet-based protocol, or the like. In some examples, a calling device 111A-111N may be associated with a client device and/or a user identifier associated with the client device and the group-based communication system 105. In some examples, calling devices are any devices capable of making calls whether through a telephone network, voice over internet protocol (VoIP), an internet-based protocol, and/or the like.

In some examples, a calling device 111A-111N is not associated with a client device. In some examples, a calling device 111A-111N is not associated with a user identifier associated with the group-based communication system 105. In such examples, the calling device 111A-111N may include an independent device not registered with the group-based communication system105. Additionally, in such examples, the user associated with a calling device 111A-111N may include a limited user. The limited user may include a user who interacts with the group-based communication system by initiating a call-based channel communication. In some examples, the limited user may be associated with a limited user identifier, or unique identifier used to identify the particular limited user, the calling device 111A-111N, and/or telephone number associated therewith.

In some examples, the limited user may have associated therewith a limited user profile. A limited user profile may include for example, a limited user identifier, a telephone number, a calling device identifier associated with the calling device, one or more group-based communication channel identifiers associated with group-based communication channels that the limited user has been granted access to or has been initiating call-based channel communication for. A username associated with a limited profile may be automatically generated by the group-based communication system based on the telephone number in the limited user profile.

In some examples, the calling device 111A-111N may be connected to a communications network 114 which may include any wired or wireless communication network that enables call for the calling device 111A-111N, for example, the public switched telephone network (PSTN) or the public land mobile network (PLMN), various wireless network for mobile devices such as a Global System for Mobile Communications (GSM), a Code-division multiple access (CDMA), a Long Term Evolution (LTE network), fifth generation (5G) cellular network, a private network such as, a private network that includes, by way of example, a private branch exchange (PBX) for calling devices, Integrated Services Digital Network (ISDN), communication networks that enable VoIP calls, or combinations thereof, and may utilize a variety of networking protocols now available or later developed.

Communications network 114 may include any wired or wireless communication network that enables call between a telephone number associated with the calling devices 111A-111N and the call server 116 including, for example, a PLMN network, a PSTN network, various wireless network for mobile devices such as a Global System for Mobile Communications (GSM), a Code-division multiple access (CDMA), a Long Term Evolution (LTE network), fifth generation (5G) cellular network, a private network such as, a private network that includes, by way of example, a private branch exchange (PBX) for calling devices, Integrated Services Digital Network (ISDN), communication networks that enable VoIP calls, or combinations thereof, and may utilize a variety of networking protocols now available or later developed.

The call server 116 may be embodied as a software platform and associated hardware that may be configured to manage incoming call-based channel communications from a calling device. The call server generates call objects based on such call-based channel communications and transmit such call objects to a group-based communication server for further processing. A call server may be associated with one or more call server telephone numbers. In some examples, each call server telephone number may be pre-defined to be associated with a distinct group-based communication channel identifier. In some examples, a call server telephone number not associated with a distinct group-based communication channel identifier may also be associated with the call server. The call server may be reached via calls or short message service (SMS) from any call server telephone number associated with the call server.

Example Apparatuses Utilized with Various Embodiments

Figure 2A:
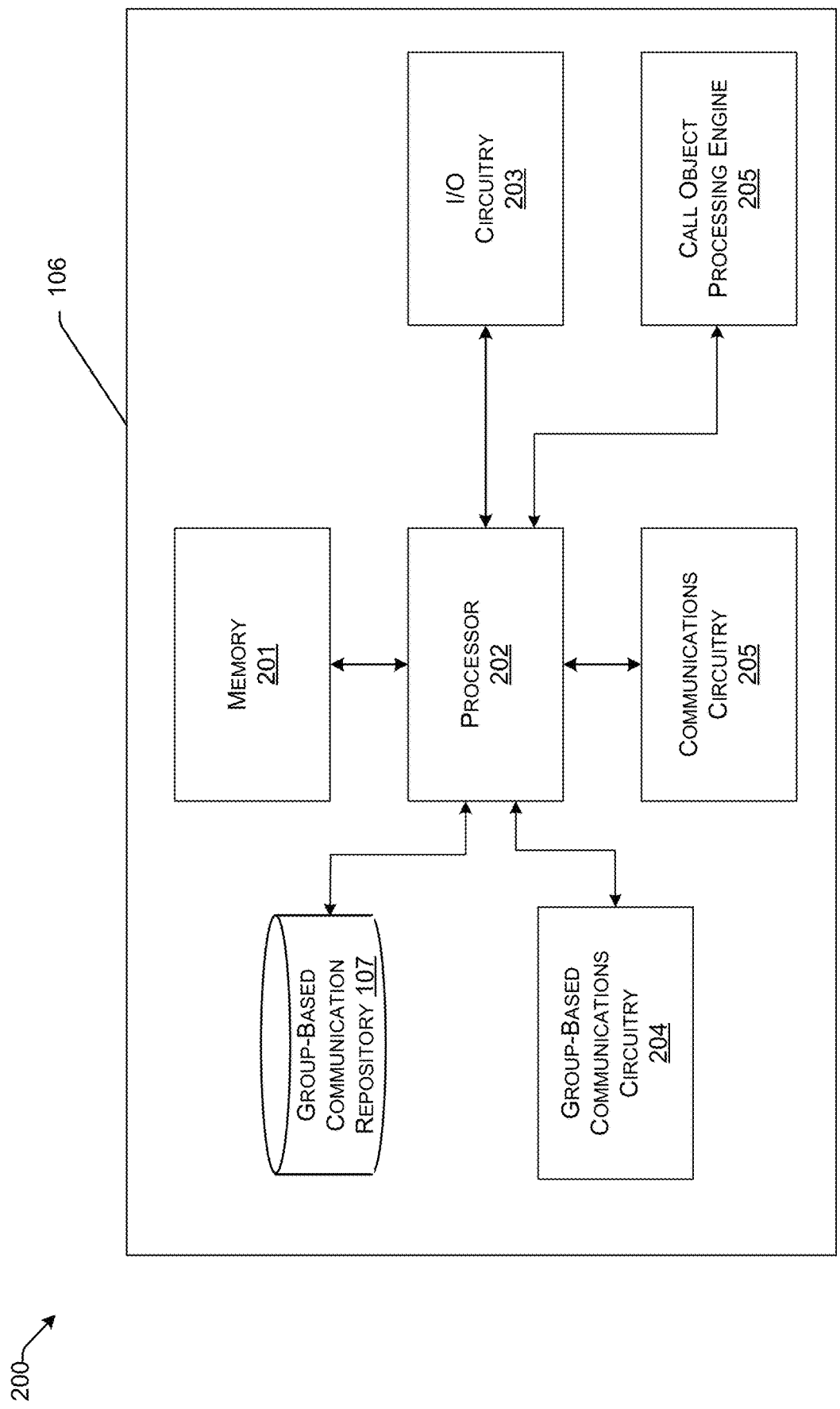
FIG. 2A shows exemplary apparatuses for implementing examples of the present disclosure.

The group-based communication server 106 may be embodied by one or more computing systems, such as apparatus 200 shown in FIG. 2A. The apparatus 200 may include a processor 202, a memory 201, input/output circuitry 203, group-based communication circuitry 204, communications circuitry 205, and group-based communication repository 107. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some examples, software for configuring the hardware. For example, in some examples, "circuitry" may include processing circuitry, storage media, network interfaces, input/output devices, and the like. In some examples, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some examples, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may thus be differentiated from a computer-readable transmission medium, which may refer to an electromagnetic signal. The memory 201 may be configured to store information, data, content, applications, instructions, or the like, for enabling the apparatus 200 to carry out various functions in accordance with example examples of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In one example, the processor 202 may be configured to execute instructions stored in the memory 201 or otherwise accessible to the processor. Alternatively, or additionally, the processor 202 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some examples, the processor 202 is coupled with a call object processing engine 206. The call object processing engine 206 may take the form of, for example, a code module, a component, circuitry and/or the like. In some examples, the call object processing engine 206 may be configured to access or otherwise ingest call objects or objects received by the group-based communication system 105 or stored in the group-based communication repository 107. A call object may include data generated by a call server (e.g., call server 116) based on a call-based channel communication from a calling device and subsequently transmitted from the call server to a group-based communication server. Call objects may include call-based communication action event data structure, call-based communication metadata, and other data generated by a call server and transmitted to the group-based communication server. In some examples, the call object processing engine 206 includes a thread identification module configured to parse a group-based communication message corpus to generate one or more thread message corpuses.

In some examples, the apparatus 200 may include input/output circuitry 203 that may, in turn, be in communication with processor 202 to provide output to the user and, in some examples, to receive an indication of a user input. The input/output circuitry 203 may comprise a user interface and may include a display and may comprise a web user interface, a mobile application, a client device, a kiosk, or the like. In some examples, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some examples, the group-based communication circuitry 204 may include a separate processor, specially configured field programmable gate array (FPGA), or application specific interface circuit (ASIC).

The communications circuitry 205 may be any means such as a device or circuitry embodied in either hardware or a combination of hardware and software that may be configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the network interface may include the circuitry for interacting with the antenna(s) to cause transmission of signals via the antenna(s) or to handle receipt of signals received via the antenna(s).

As described above and as will be appreciated based on this disclosure, examples of the present disclosure may be configured as methods, mobile devices, backend network devices, and the like. Accordingly, examples may comprise various means including entirely of hardware or any combination of software and hardware. Furthermore, examples may take the form of a computer program product on at least one non-transitory computer-readable storage medium having computer-readable program instructions (e.g., computer software) embodied in the storage medium. Similarly, examples may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices. Moreover, although not shown, various examples of a group-based communication system may comprise one or more databases configured for storing and/or indexing messages exchanged within various group-based communication channels.

Moreover, although not shown, various examples of a group-based communication platform may comprise one or more databases configured for storing and/or indexing messages exchanged within various group-based communication channels.

Figure 2B:
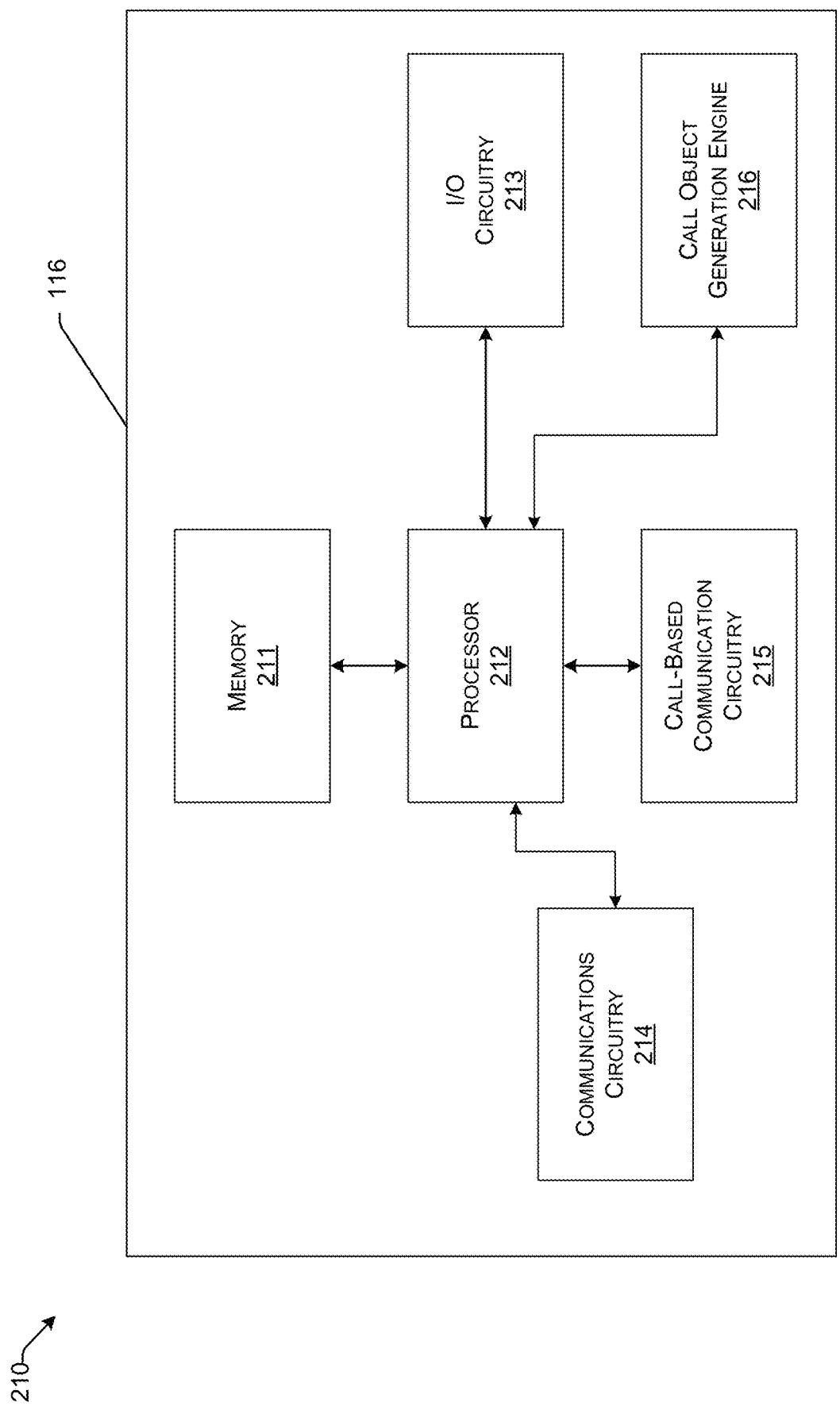
FIG. 2B shows exemplary apparatuses for implementing examples of the present disclosure.

The call server 116 may be embodied by one or more computing systems, such as apparatus 210 shown in FIG. 2B. As discussed above, the call server 116 may be configured to manage incoming call-based channel communications from a calling device. The call server 116 may be associated with one or more call server telephone numbers. In some examples, each call server telephone number may be pre-defined to be associated with a distinct group-based communication channel identifier. In some examples, a call server telephone number not associated with a distinct group-based communication channel identifier may also be associated with the call server. The call server may be reached via calls or short message service (SMS) from any call server telephone number associated with the call server. In some examples, the call server may include a voice over Internet Protocol (VoIP) call server. In some examples, the call server may include software or hardware for encoding and decoding digital data into analog voice signals and may transmit speech data via a network, such as an Internet network, that is integrated into a telephone network such as the public switched telephone network (PSTN) or the public land mobile network (PLMN).

The apparatus 210 may include a memory 211, a processor 212, input/output circuitry 213, communications circuitry 214, call-based communications circuitry 215, and call object generation engine 214. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry.

In some examples, other elements of the apparatus 210 may provide or supplement the functionality of particular circuitry. For example, the processor 212 may provide processing functionality, the memory 211 may provide storage functionality, the communications circuitry 214 may provide network interface functionality, the call-based communications circuitry 215 may provide call-based communication functionality, and the like.

In some examples, the processor 212 (and/or co-processor or any other processing circuitry assisting or otherwise associated with the processor) may be in communication with the memory 211 via a bus for passing information among components of the apparatus. The memory 211 may be non-transitory and may include, for example, one or more volatile and/or non-volatile memories. In other words, for example, the memory may be an electronic storage device (e.g., a computer readable storage medium). The memory 211 may thus be differentiated from a computer-readable transmission medium, which may refer to an electromagnetic signal. The memory 211 may be configured to store information, data, content, applications, instructions, or the like, for enabling the apparatus 200 to carry out various functions in accordance with examples of the present disclosure.

The processor 212 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In one example, the processor 212 may be configured to execute instructions stored in the memory 211 or otherwise accessible to the processor. Additionally or alternatively, the processor may be configured to execute hard-coded functionality. As such, whether configured by hardware or software methods, or by a combination thereof, the processor may represent an entity (e.g., physically embodied in circuitry) capable of performing operations according to an example of the present disclosure while configured accordingly. Alternatively, as another example, when the processor is embodied as an executor of software instructions, the instructions may specifically configure the processor to perform the algorithms and/or operations described herein when the instructions are executed. In some examples, the processor 202 is coupled with a call object generation engine 216.

The call object generation engine 216 may take the form of, for example, a code module, a component, circuitry and/or the like. In some examples, the call object generation engine 216 may be configured to receive call-based channel communication via the call-based communications circuitry 215 from a calling device. The call-based channel communication may include a communication transmitted from a calling device to the call server 116. In some examples, a call-based channel communication utilizes one of the PSTN or the PLMN.

In some examples, the call-based channel communication may include a call, such as a call over a telephone network, a voice over Internet Protocol (VoIP) call, or a call in another form between the calling device and the call server. The call may be dialed from a telephone number associated with the calling device to a call server telephone number associated with the call server. The call server telephone number associated with the call server may be pre-defined to be associated with a group-based communication channel identifier. In some examples, the call-based channel communication may include a textual communication such as a text message via a SMS from the calling device to the call server. The text message via the short message service may be from the telephone number associated with the calling device to the call server telephone number associated with the call server.

In some examples, the call-based channel communication may have associated therewith call-based communication metadata, such as the originating telephone number, the destination telephone number, a timestamp associated with the call-based channel communication, a duration of the call-based channel communication in circumstances where the call-based channel communication is a telephone-call, International Mobile Subscriber Identity (IMSI) number associated with the calling device, International Mobile station Equipment Identity (IMEI) number associated with the calling device, trunk identifiers, or other metadata associated with the call-based channel communication. In some examples, the destination telephone number may be associated with a group-based communication channel identifier.

In various examples, the call object generation engine 216 generates call objects based on call-based channel communications. A call object may include call-based communication action event data structure, call-based communication metadata, and/or other data. In various examples, the call-based communication action event data structure may represent an action to be taken, such as rendering one or more group-based communication messages, transmitting a group-based communication inquiry event response (e.g., voice or textual fragment transmitted from the call server 116 to the calling device in response to an inquiry about a functionality of the group-based communication system), or the like. The action may be performed by the call server 116 and/or the group-based communication server. For example, if the call-based channel communication is a call, the call object generation engine 216 may be configured to transcribe (may be in real-time or near real-time) the call to identify the call-based communication action event (e.g., voice or textual fragment that inquires about a functionality of a group-based communication system) representation in the form of a voice fragment. For another example, if the call-based channel communication is a SMS, the call object generation engine 216 may be configured to parse the SMS to identify the call-based communication action event representation in the form of a textual fragment.

After identifying the call-based communication action event representation, the call object generation engine 216 may generate the call-based communication action event data structure that may be included in one or more call objects to be transmitted to the group-based communication server. In some examples, the call object generation engine 216 may transmit the call objects to a group-based communication server for further processing.

In some examples, the apparatus 210 may include input/output circuitry 213 that may, in turn, be in communication with processor 212 to provide output to a user. The input/output circuitry 203 may comprise a user interface and may include a display and may comprise a web user interface, a mobile application, a client device, a kiosk, or the like. In some examples, the input/output circuitry 213 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 211, and/or the like).

The communications circuitry 214 may be any means such as a device or circuitry embodied in either hardware or a combination of hardware and software that may be configured to receive and/or transmit data from/to a network and/or any other device, circuitry, or module in communication with the apparatus 210. In this regard, the communications circuitry 214 may include, for example, a network interface for enabling communications with a wired or wireless communication network. For example, the communications circuitry 214 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The call-based communication circuitry 215 includes may be any means such as a device or circuitry embodied in either hardware or a combination of hardware and software that may be configured to receive and/or transmit from/to a telephone network and/or any other calling device. In this regard, the call-based communication circuitry 215 may include, for example, one or more telephone network interface cards, antennae, buses, switches, routers, modems, and supporting hardware and/or software, or any other device suitable for enabling telephone communications (which may require a telephone number) via the telephone communications network.

As described above and as will be appreciated based on this disclosure, examples of the present disclosure may be configured as methods, mobile devices, backend network devices, and the like. Accordingly, examples may comprise various means including entirely of hardware or any combination of software and hardware. Furthermore, examples may take the form of a computer program product on at least one non-transitory computer-readable storage medium having computer-readable program instructions (e.g., computer software) embodied in the storage medium. Similarly, examples may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In some examples, the call server 116 may include a telephone number-channel identifier association repository that stores association of call server telephone number and group-based communication channel identifiers.

Moreover, although not shown, various examples of a call server may comprise one or more databases configured for storing and/or indexing call-based channel communications metadata, call-based communication action event data structure call objects, or the like.

FIGS. 3A-6 illustrate example processes in accordance with examples of the disclosure. These processes are illustrated as logical flow graphs, each operation (e.g., block) of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Example Operations of the Call Server

FIG. 3A is a flowchart of an example method 300, illustrating exemplary functionality of a call server 116. As discussed herein, various examples enable the group-based communication platform to manage incoming call-based channel communications.

As indicated at Block 310, the call server 116 may be configured to receive, from a calling device associated with a first user, a request to send a call-based communication via a communication channel (e.g., group-based communication channel) of a communication platform. The request may include a request to send a call-based communication (e.g., message, call-based channel communication) via a communication platform (e.g., group-based communication system). In some examples, the request may include a particular communication channel for publication of the message.

The calling device may include computer hardware and/or software that may be configured to initiate a call-based channel communication to a call server to engage with a group-based communication system associated with the call server. In some examples, a calling device may be associated with a client device and/or a user identifier associated with the client device and the group-based communication system. In some examples, a calling device is not associated with a client device. In some examples, a calling device is not associated with a user identifier associated with the group-based communication system.

Computing devices enabling the calling device may include one or more of: a desktop telephone, a mobile device such as a mobile cell phone, a computer capable of making calls or transmitting short message service (SMS) messages (e.g., text messages). In some examples, the calling device may be connected to a telephone communications network which may include any wired or wireless communication network that enables call for the calling device, for example, PLMN or PSTN, various wireless network for mobile devices such as a Global System for Mobile Communications (GSM), a Code-division multiple access (CDMA), a Long Term Evolution (LTE network), fifth generation (5G) cellular network, a private network such as, a private network that includes, by way of example, a private branch exchange (PBX) for calling devices, Integrated Services Digital Network (ISDN), communication networks that enable VoIP calls, or combinations thereof, and may utilize a variety of networking protocols now available or later developed. In some examples, only devices that used, at least in part, the PLMN or the PSTN to communicate with the call server 116 via a call or a SMS are considered to be a calling device.

The call-based channel communication (e.g., call-based communication, message, etc.) is a communication transmitted from a calling device to a call server, for publication via a communication channel managed by a group-based communication platform. A call-based communication may include a call, such as a call over a telephone network, a voice over Internet Protocol (VoIP) call, or a call in another form between the calling device and the call server. The call may be dialed from a telephone number associated with the calling device to a call server telephone number associated with the call server. The call server telephone number associated with the call server may be pre-defined to be associated with a group-based communication channel identifier. In some alternative examples, a call-based communication may include a textual communication such as a text message via a SMS from the calling device to the call server. The text message via the SMS may be from the telephone number associated with the calling device to the call server telephone number associated with the call server.

As indicated at (optional) Block 320, the call server 116 may be configured to identify a communication channel identifier based at least in part on the request. A communication channel identifier is one or more items of data by which a communication channel may be uniquely identified by a group-based communication system. For example, a group-based communication channel identifier may comprise American Standard Code for Information Interchange (ASCII) text, a pointer, a memory address, and the like.

In some examples, the call server 116 may be configured to identify the communication channel identifier based on the call-based channel communication request directly. For example, the call server 116 may receive an indication of the group-based communication channel identifier via SMS or via voice or number dial in call. In some examples, the call server 116 may identify the communication channel identifier by identifying the call server telephone number associated with the call server that the call-based channel communication communicated with. In some examples, the call server telephone number is uniquely associated with one particular group-based communication channel identifier. Therefore, by identifying the call server telephone number associated with the call server with which the call-based channel communication is associated, the call server 116 can identify the communication channel identifier by querying the telephone number-channel identifier association repository that stores pre-defined associations of call server telephone numbers and group-based communication channel identifiers.

In some examples, one or more call server telephone numbers are not uniquely associated with a communication channel identifier, but uniquely associated with a workspace identifier. In some examples, an additional call server telephone number may be associated with the call server 116 and not associated with any identifier of the group-based communication system.

As indicated at (optional) Block 330, the call server 116 may be configured to extract call-based communication metadata based at least in part on the request. Call-based communication metadata is metadata associated with a call-based communication such as the telephone number associated with the calling device (e.g., sending device telephone number), the destination telephone number, a timestamp associated with the call-based communication, duration of the call-based communication in circumstances where the call-based communication is a telephone-call, International Mobile Subscriber Identity (IMSI) number associated with the calling device, International Mobile station Equipment Identity (IMEI) number associated with the calling device, trunk identifiers, or other metadata associated with the call-based communication.

In some examples, portions of the call-based communication metadata may be extracted as calling device identification information (e.g., calling device data). Calling device identification information are identifiers that may be used to uniquely identify a calling device such as, for example, identifiers associated with a telephone number such as the telephone number itself, the IMSI number, or the like, and/or equipment identifiers such as the IMEI number or the like. In some examples, as later detailed in FIG. 3B and associated descriptions, the call server 116 may use the calling device identification information to verify that the calling device is defined to have access to the group-based communication channel identifier before transmitting the one or more call objects to the group-based communication server.

As indicated at Block 340, the call server 116 may be configured to generate action event data structures (e.g., call-based communication action event data structure) based on the request. A call-based communication action event data structure may include a data structure generated by a call server based on a call-based communication representing an action to be taken by a call server or a group-based communication server, such as rendering one or more group-based communication messages, transmitting a group-based communication inquiry event response, or the like. For example, if the call-based communication is a call, the call server may be configured to transcribe (in real-time or near real-time) the call to identify the call-based communication action event representation in the form of a voice fragment. In such an example, the call server may be configured to perform automatic speech recognition (ASR) to analyze and process acoustic signals received via the call. In various examples, the call server may be configured to perform natural language processing or understanding, such as to derive a semantic interpretation of the data transmitted via the call. For another example, if the call-based communication is a SMS, the call server may be configured to parse the SMS to identify the call-based communication action event representation in the form of a textual fragment. After identifying the call-based communication action event representation, the call server may generate the call-based communication action event data structure that may be included in one or more call objects to be transmitted to the group-based communication server.

As indicated at Block 350, the call server 116 may be configured to generate one or more call objects based at least in part on the communication channel and the action event data structure. In some examples, the call server 116 is further configured to generate the one or more call objects based on the call-based communication metadata. In some examples, the one or more call objects may be generated based on a determination that the calling device is an authorized device. In such examples, the determination that the calling device is an authorized device may be based on a comparison between the calling device data (e.g., one or more identifiers associated with a telephone number (e.g., the telephone number itself, the IMSI number, etc.) and/or one or more equipment identifiers (e.g., an IMEI number, etc.)) and calling device data associated with one or more authorized devices. The calling device data associated with the authorized device(s) may be stored in a database associated with the call server 116 and/or the group-based communication system (e.g., repository 107). In some examples, the call server 116 may determine that the calling device is an authorized device based on a difference between the calling device data and authorized calling device data is less than a threshold difference.

The call object(s) may include data generated by a call server based on a call-based communication from a calling device and subsequently transmitted from the call server to a group-based communication server. In various examples, the call object(s) may include a call-based communication action event data structure, call-based communication metadata, and other data generated by a call server 116.

As indicated at Block 360, the call server 116 may be configured to send (e.g., transmit) the one or more call objects to a group-based communication server computing device associated with the communication platform. In some examples, as later detailed in FIG. 3B and associated descriptions, the call server 116 may take certain actions before transmitting the one or more call objects to the group-based communication server.

Figure 3B:
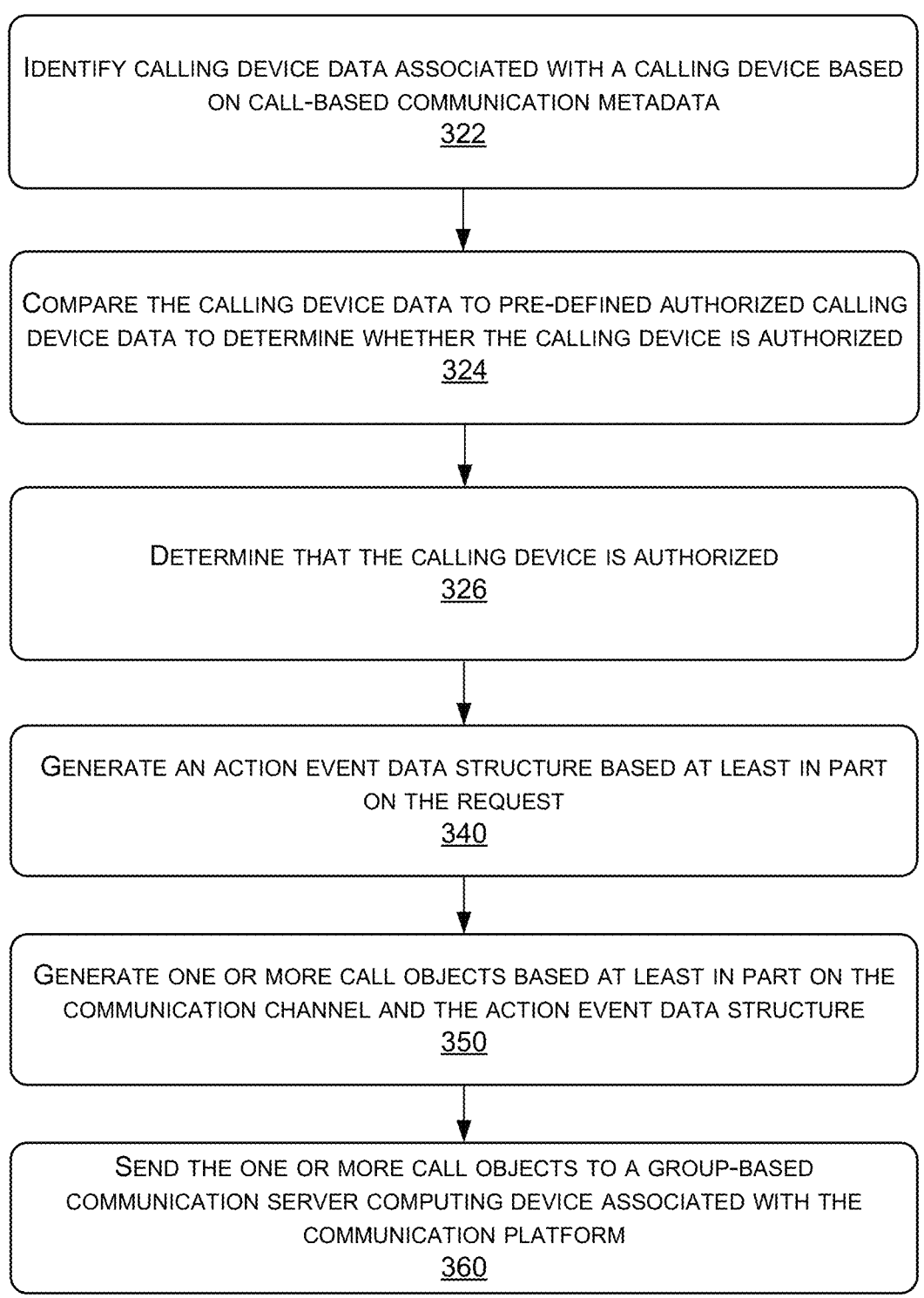

FIG. 3B is another flowchart illustrating the functionality of a call server 116. Specifically, the operations depicted with respect to FIG. 3B include operations for determining that the calling device is authorized. Such determination may happen before operations indicated in either one of Blocks 340, 350, or 360 of FIG. 3A and the operations indicated in either one of Blocks 340, 350, or 360 of FIG. 3A may be conditioned on the determination.

As indicated at Block 322, the call server 116 may be configured to identify calling device data (e.g., calling device identification information) associated with a calling device based on call-based communication metadata. Calling device identification information may include one or more identifiers that may be used to uniquely identify a calling device, such as one or more identifiers associated with a telephone number (e.g., the telephone number itself, the IMSI number, etc.) and/or one or more equipment identifiers (e.g., an IMEI number, etc.).

As indicated at Block 324, the call server 116 may be configured to compare the calling device identification information for the calling device with pre-defined authorized calling device data to determine whether the calling device is authorized. The pre-defined authorized calling device data (e.g., authorized calling device data) may include calling device identification information associated with one or more calling devices authorized to make call-based channel communication with the call server. The pre-defined authorized calling device information may be stored in a database associated with the call server 116, such as in memory 211. The pre-defined authorized calling device information may include one or more of: an identifier associated with a telephone number (e.g., the telephone number itself, the IMSI number, etc.) and/or an equipment identifier (e.g., IMEI number, etc.). In some examples, different sets of pre-defined authorized calling device information may be defined for different group-based communication channel identifiers. In some examples, the calling device identification information is a telephone number associated with the calling device. In some examples, the calling device identification information is an equipment identifier that uniquely identifies the calling device.

As indicated at Block 326, the call server 116 may be configured to determine that the calling device is authorized ("Yes" at block 322). The call server 116 may determine that the calling device calling device is authorized in an instance in which one or more identifiers in the calling device identification information matches one of the identifiers stored as pre-defined authorized calling device information. In some examples, the call server 116 determines that the calling device is authorized based on the calling device identification information matching one of the identifiers stored as pre-defined authorized calling device information for the group-based communication channel identifier identified in Block 320. In various examples, the identifiers may be determined to match based on a determination that a difference between the calling device data and the pre-authorized calling device data is less than a threshold difference. After Block 326, the call server 116 may continue with the operations in Block 340, 350 or 360 of FIG. 3A.

Figure 3C:
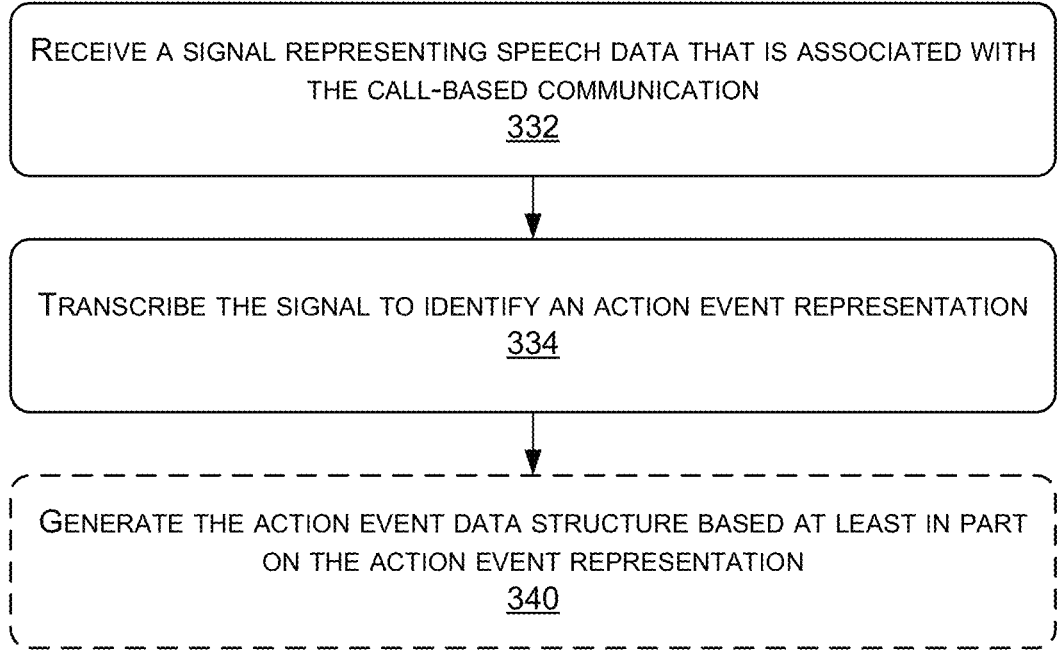

FIG. 3C is another flowchart illustrating the functionality of a call server 116. Specifically, the operations depicted with respect to FIG. 3C include operations for generating the one or more call-based communication action event data structures based on the call-based channel communication in an instance in which the call-based channel communication is a call.

As indicated at Block 332, the call server 116 may be configured to receive a signal representing speech data (e.g., voice data) that is associated with the call-based communication. In some examples, the signal may include a telecommunication signal. In some examples, the voice data may be representative of the message (e.g., the call-based channel communication, call-based communication, etc.). For example, speech data may include voice data representing text to be included in a group-based communication message to be rendered on a group-based communication interface.

As indicated at Block 334, the call server 116 may be configured to transcribe the signal to identify an action event representation (e.g., call-based action event). In some examples, the transcription may occur in real-time or near real-time. In some examples, the call server 116 may convert at least a portion of the voice data to textual data to be rendered via the communication channel. In various examples, the call server 116 may utilize ASR to transcribe the signal. Based at least in part on the signal received at Block 332 representing speech data, the call-based communication action event representations include voice fragments in the speech data (e.g., the at least the portion of the voice data). In other examples, and as will be discussed with regard to FIG. 3D, the call-based communication action event representation may include textual data, such as that received via a text message.

As indicated at Block 340, the call server 116 may be configured to generate the action event data structure (e.g., one or more call-based communication action event data structures) based on the action event representations (e.g., call-based action event). The action event data structure may represent an action to be taken, such as rendering one or more group-based communication messages, transmitting a group-based communication inquiry event response. The action may be performed by the call server 116 and/or the group-based communication server.

Figure 3D:
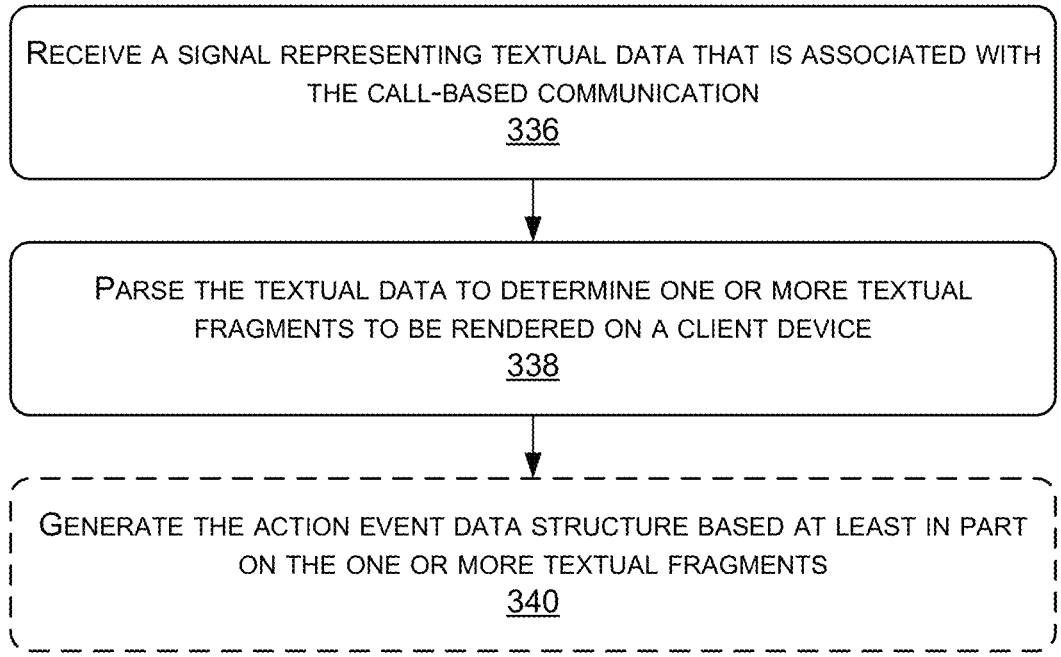

FIG. 3D is another flowchart illustrating the functionality of a call server 116. Specifically, the operations depicted with respect to FIG. 3D include operations for generating the one or more call-based communication action event data structures based on the call-based channel communication in an instance in which the call-based channel communication is a SMS message.

As indicated at Block 336, the call server 116 may be configured to receive a signal representing textual data that is associated with the call-based communication. The textual data may include text embedded in the SMS (e.g., a text message). In some examples, the textual data or at least a portion thereof may represent the call-based communication (e.g., message, call-based channel communication). For example, the text embedded in the SMS may include text to be included in a group-based communication message to be rendered on a group-based communication interface.

As indicated at Block 338, the call server 116 may be configured to parse the textual data that is associated with the call-based channel communication, such as the SMS, to determine one or more textual fragments to be rendered on a client device. In some examples, the textual fragment(s) (e.g., action event representation) may represent an action to be taken by a call server and/or a group-based communication server. In some examples, the textual fragment(s) may include a series of words (e.g., a sentence, a fraction thereof, etc.) used as the basis for generating the message.

As indicated at Block 340, the call server 116 may be configured to generate the action event data structures (e.g., one or more call-based communication action event data structures) based on the one or more textual fragments. The call-based communication action event data structure may represent an action to be taken, such as rendering one or more group-based communication messages, transmitting a group-based communication inquiry event response. The action may be performed by the call server 116 and/or the group-based communication server.

Figure 3E:
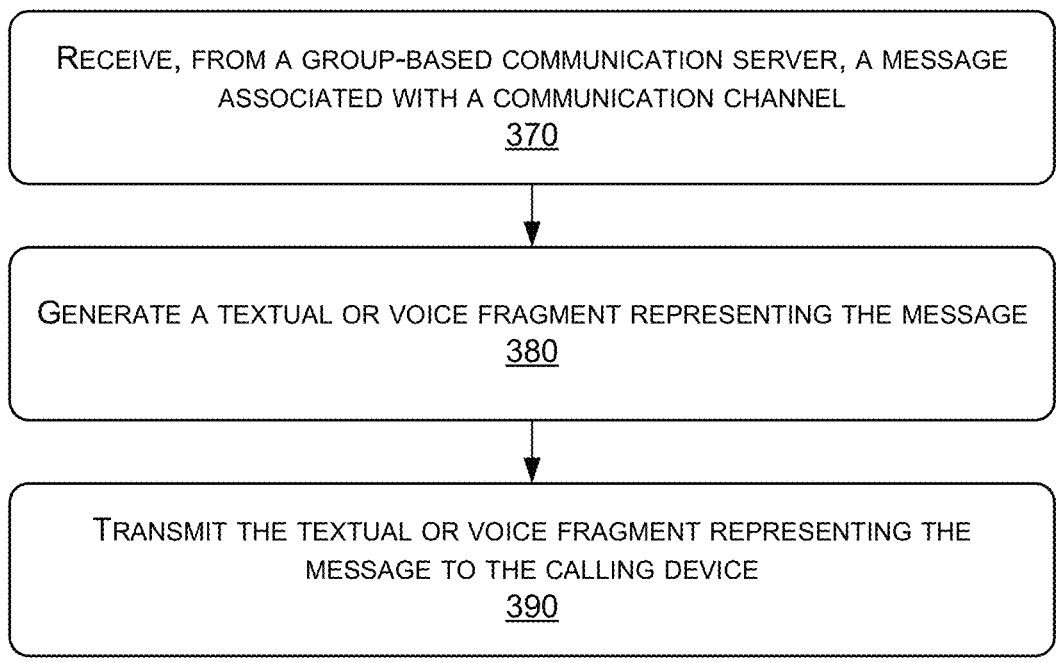

FIG. 3E is another flowchart illustrating the functionality of a call server 116. Specifically, the operations depicted with respect to FIG. 3E include operations for receiving one or more group-based communication messages associated with a group-based communication interface associated with the group-based communication channel identifier. The group-based communication messages may be transmitted by other client devices associated with the group-based communication identifier.

As indicated at Block 370, the call server 116 may be configured to receive, from a group-based communication server, a message (e.g., group-based communication message) associated with a communication channel (e.g. group-based communication channel). The communication channel may be associated with a communication channel identifier. In some examples, the communication channel identifier may include the communication channel identifier previously identified in Block 320 of FIG. 3A. In various examples, the communication channel may have associated therewith a communication channel interface. The message may be received as a standalone message or a channel message corpus. A channel message corpus may include a collection of communication messages in a group-based communication channel. In some examples, channel message corpus may be constructed based on a pre-defined trigger. In some examples, a channel message corpus may be constructed by periodically collecting group-based communication messages based on time stamp data. In some examples, a channel message corpus may be constructed by collecting group-based communication messages after a defined number of messages with identical group-based communication channel identifier or thread identifier is received. In some examples, a channel message corpus may be constructed by collecting group-based communication messages after receiving a request (such as a user request) to construct a channel message corpus. In some examples, a channel message corpus may be constructed by collecting group-based communication messages in a particular thread that initiated in a channel but continues separate from the channel.

In some examples, the group-based communication server transmits one or more group-based communication messages associated with the group-based communication interface associated with the group-based communication channel identifier based on a determination that the one or more group-based communication messages are determined to be part of a same conversation segment as one or more group-based communication messages generated based on the one or more telephone communication action event data structures.

A conversation segment may include a set of communication messages grouped by a server in a group-based communication system where the communication messages within the conversation segment are determined to have at least one identical conversation primitive identifier. In some examples, communication messages in one conversation segment are directed to the same topic. In some examples, a set of communication messages in one conversation segment may be thread communication messages in one particular thread. In some examples, the set of communication messages in one conversation segment may be non-thread communication messages that shares the same topic. In some examples, the set of communication messages in one conversation segment has message send order proximity and message send time proximity, exceeds a respective defined threshold. In some examples, one conversation segment may be determined to be related to another conversation segment and one conversation segment may include several conversation segments. In some examples, a conversation segment may be grouped by a server by using a conversation segmenting learning model. In some examples, a conversation segment may further include a conversation primitive identifier. In some examples, a conversation segment may include a topic associated with the conversation segment.

As indicated at Block 380, the call server 116 may be configured to generate a textual or voice fragment representing the message. If the call-based communication is a call, the call server 116 may generate a voice fragment. If the call-based communication is a SMS, the call server 116 may generate a textual fragment.

As indicated at Block 390, the call server 116 may be configured to transmit the textual or voice fragment representing the message to the calling device. In some examples, the call server 116 may transmit the voice fragment via telecommunication signal encoding speech data incorporating the voice fragment via a telephone communications network to the calling device. In some examples, the call server 116 may transmit the textual fragment via a SMS incorporating the text fragment via a telephone communications network to the calling device.

In some examples, the call server 116 may be configured to receive one or more messages generated by a bot in the group-based communication system; generate textual or voice fragment representing the one or more messages generated by the bot; and transmit the textual or voice fragment via the call-based communication to the calling device. The one or more messages generated by the bot may be generated as a group-based communication inquiry event response.

Figure 3F:
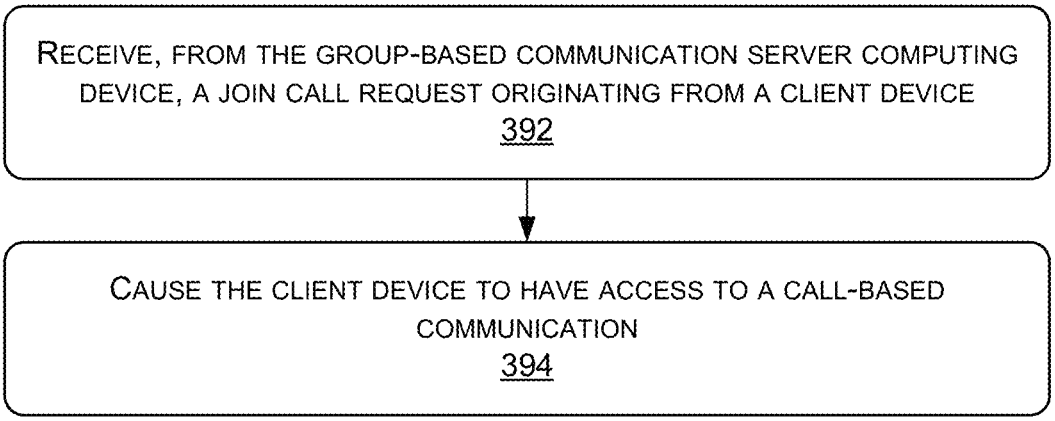

FIG. 3F is another flowchart illustrating the functionality of a call server 116. Specifically, the operations depicted with respect to FIG. 3F include operations for including one or more client devices in the call-based communication with the calling device in an instance in which the call-based communication is a call.

As indicated at Block 392, the call server 116 may be configured to receive, from the group-based communication server computing device, a join call request originating from a client device. In some examples, the client device may be associated with the communication channel and/or the communication channel identifier determined at Block 320 of FIG. 3A. In various examples, the join call request may be received responsive to a rendering of the first message or an indication thereof on the communication channel. In such examples, the indication may include a notification that the user associated with the calling device is calling via the group-based communication channel.

As indicated at Block 394, the call server 116 may be configured to cause the one or more client devices to have access to a call-based communication. In some examples, the call server 1167 may provide the client device(s) access to the call-based communication (e.g., call). In some examples, the call server 116 may be configured to cause the one or more client devices to have access to the call-based communication by dialing one or more telephone numbers associated with the one or more client devices that allow the one or more client devices to join the call-based communication via telephone communication. In such examples, the call server 116 may generate a first connection between the call server 116 and a client device, the first connection being based at least in part on a telephone number associated with the client device, and linking the first connection to a second connection between the call server 116 and the calling device, the second connection being representative of the original call. In some examples, the call server may generate a bridge between the first connection and the second connection to facilitate communication between a first user of the calling device and a second user of the client device.

In some examples, the call server 116 may be configured to cause the one or more client devices to have access to the call-based communication by causing the transmitting a link for joining the call-based communication to the group-based communication server which may be rendered by the one or more client devices and may be interactable to join the call-based communication by a user. In such examples, the link may enable the client device to access the call.

In various examples, client devices and/or the calling devices may leave a call-based communication. The call server 116 may be configured to monitor client devices and/or calling devices that join the call and client devices and/or calling devices that leave the call in a join/leave log. The call server may transmit the join/leave log to the group-based communication server 106 and the group-based communication 106 may be configured to transmit the join/leave log for rendering on the group-based communication interface associated with the group-based communication channel identifier. One or more client devices associated with the group-based communication channel identifier, which may include client devices that did not join the call-based communication, may render the join/leave log on the group-based communication interface.

Example Operations of the Group-Based Communication Server

Figure 4A:
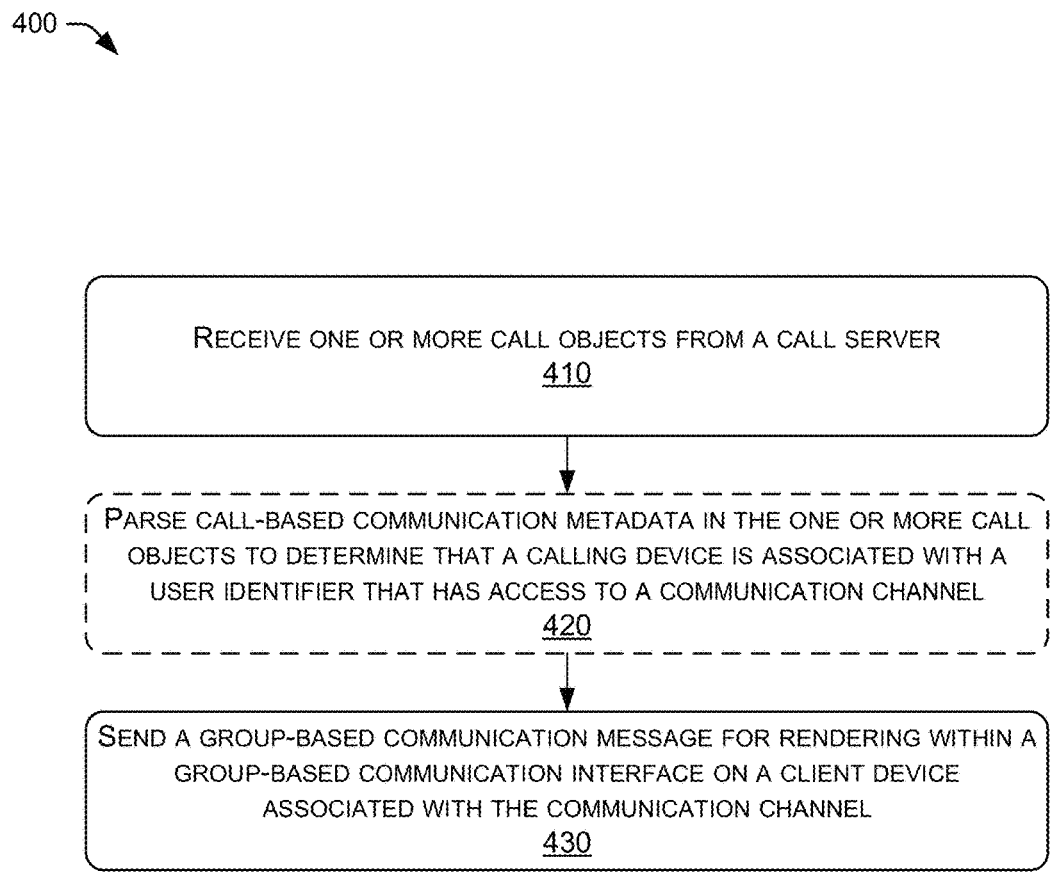
FIGS. 4A-4B are example flowcharts illustrating the functionality of various computing entities according to various examples of the present disclosure.

FIG. 4A is a flowchart of an example method 400, illustrating exemplary functionality of a group-based communication server 106. As discussed herein, various examples enable the group-based communication platform to manage incoming call-based channel communications.

As indicated at Block 410, the group-based communication server 106 may be configured to receive one or more call objects from a call server. In some examples, the one or more call objects comprises one or more call-based communication action event data structures and a group-based communication channel identifier. In some examples, the one or more call-based communication action event data structures may comprise one or more group-based communication messages. In some examples, the one or more call objects may be generated by the call server 116, such as that described above with respect to FIGS. 3A-3F.

As indicated at Block 420, the group-based communication server 106 may be configured to optionally parse call-based communication metadata in the one or more call objects to determine that the calling device is associated with a user identifier that has access to the group-based communication channel. In some examples, the group-based communication server 106 may determine that the calling device is authorized to access the group-based communication channel identified by the group-based communication channel identifier. The group-based communication server 106 may be configured to determine that the calling device is authorized to access the group-based communication channel identified by the group-based communication channel identifier by comparing the calling device identification information for the calling device (e.g., calling device data) with pre-defined authorized calling device information (e.g., authorized calling device data) to determine that the calling device is authorized.

In various examples, the group-based communication server 106 may determine that the calling device is authorized based on a match between the calling device data and the authorized calling device data. In various examples, the calling device data and the authorized calling device data may be determined to match based on a determination that a difference between the calling device data and the authorized calling device data is less than a threshold difference. In some examples, the pre-defined authorized calling device information may be stored in the group-based communication repository 107 and/or another database associated with the group-based communication server 106.

As indicated at Block 430, the group-based communication server 106 may be configured to send a group-based communication message for rendering within a group-based communication interface on a client device associated with the communication channel (e.g., communication channel identifier). The group-based communication interface may include a virtual communications environment configured to facilitate user interaction with a group-based communications system. Each group-based communication interface is accessible and viewable to a select group of users, such as a group of employees of a business or organization (e.g., a first interface associated with a first organization may be accessible and viewable to employees of the first organization, however a second group-based communication interface associated with a second organization would not be accessible and viewable to employees of the first organization). The group-based communication interface may include a plurality of group-based communication channels (e.g., a marketing channel, sales channel, accounting channel, etc.). The communication channels may include public channels (e.g., accessible to members of an organization) or private channels (e.g., accessible to select members of the organization).

Figure 4B:
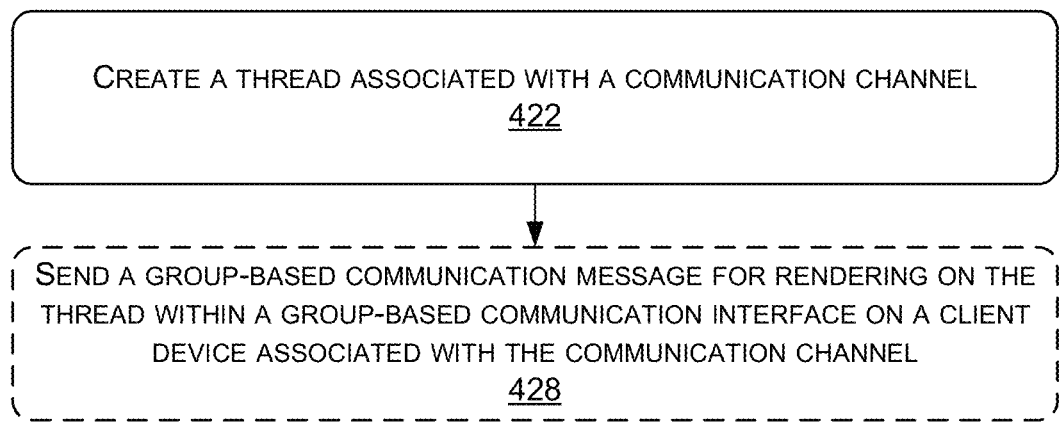

FIG. 4B is another flowchart of an example method, illustrating exemplary functionality of a group-based communication server 106. Specifically, the operations depicted with respect to FIG. 4B include operations related to creating a thread associated with the group-based communication channel identifier and use the thread for rendering.

As indicated at Block 422, the group-based communication server 106 may be configured to create a thread associated with a communication channel (e.g., group-based communication channel, group-based communication channel identifier). A thread is a collection of message communications displayed to a subsidiary feed arising from or otherwise associated with a selected group-based communication message communication displayed in a selected group-based communication interface. A thread may include one or more "threaded messages" or "thread communication messages" that are linked together in the subsidiary feed, wherein each is associated with the selected group-based communication message.

As indicated at Block 428, the group-based communication server 106 may be configured to send a group-based communication message for rendering on the thread within a group-based communication interface on a client device associated with the group-based communication channel. In some examples, the one or more group-based communication messages are rendered in the thread in the group-based communication channel as thread messages, but not in the main group-based communication channel.

Figure 5:
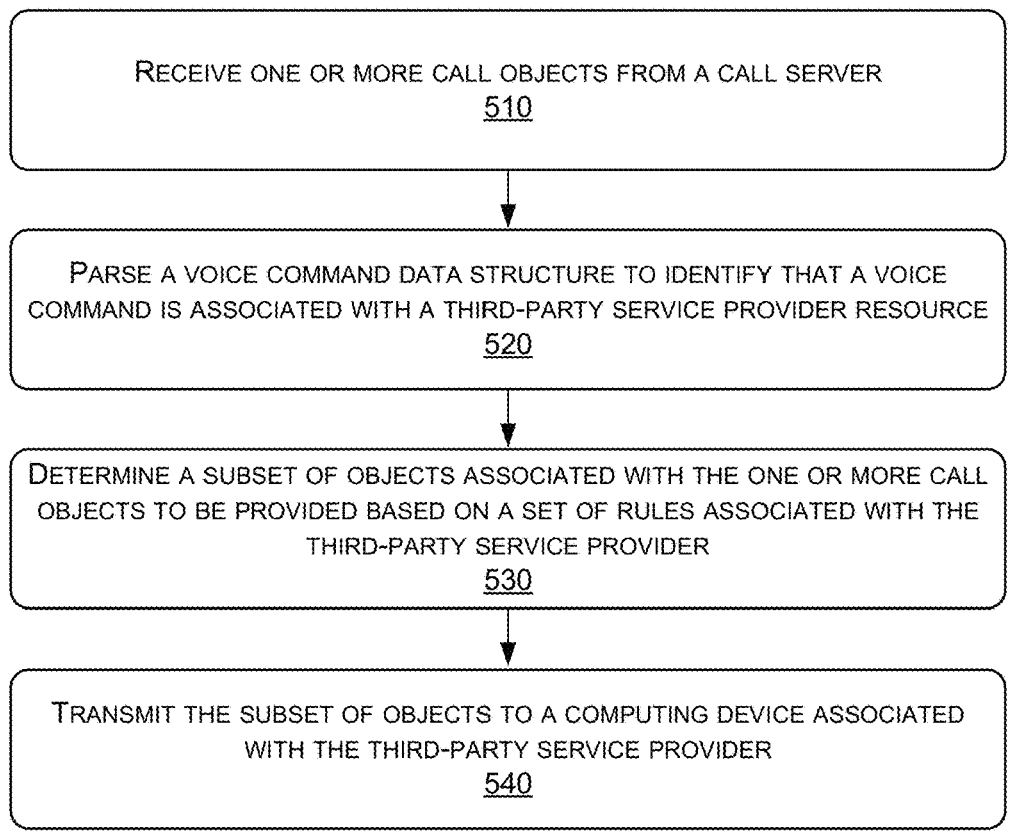
FIG. 5 is an example flowchart illustrating the functionality of various computing entities according to various examples of the present disclosure.

FIG. 5 is another flowchart of an example method 500, illustrating exemplary functionality of a group-based communication server 106. As indicated at Block 510, the group-based communication server 106 may be configured to receive one or more call objects from a call server. The one or more call objects comprises the one or more call-based communication action event data structures, the call-based communication metadata, and the group-based communication channel identifier. In some examples, the one or more call-based communication action event data structures may comprise one or more group-based communication messages.

A voice command data structure may include a data structure generated by a call server 116 based on speech data that may be transcribed into textual data that represent a voice command in a call-based communication by a group-based communication server 106. In some examples, the textual data that represent a voice command is not generated by the call server 116, but the call server 116 may nonetheless generate the voice command data structure based on the speech data and the speech data may be transcribed into textual data by a group-based communication server based on the textual data transcribed. The group-based communication server 106 may identify the voice command based on the textual data.

As indicated at Block 520, the group-based communication server 106 may be configured to parse a voice command data structure to identify that a voice command represented by the voice command data structure is associated with a third-party service provider resource. In some examples, the group-based communication server 106 may identify the third-party service provider resource based on a third-party service provider identifier. A third-party service provider may include a provider of a third-party service by way of a remote networked device, such as a server or processing device, maintained by a third-party individual, company, or organization. The third-party service provider resource may include a third-party application or computing resource that may be integrated in a group-based communication channel within a group-based communication system and may be accessed by a client device accessing the group-based communication channel. A client device in a group-based communication system may access a third-party service provider resource integrated in the group-based communication system without separately accessing the third-party service provider via a different system. For example, a third-party service provider resource may be a Software as a Service (SaaS) product or an Application (App) product that provides a SaaS or App product integrated in a group-based communication system. In such an example, a client device accessing the group-based communication system may access the SaaS or App product via a group-based communication channel that a user of the client device is associated with.

A third-party service provider identifier may include a unique identifier associated with a particular third-party resource provider. The unique identifier may include one or more items of data by which a third-party resource provider that provides a third-party resource in a group-based communication system may be identified. For example, a third-party service provider identifier may comprise ASCII text, a pointer, a memory address, and the like. The third-party service provider identifiers associated with respective third-party resource providers may be stored to a third-party resource usage record indicating a client device is authorized to access a third-party resource served by a respective third-party resource provider. In various examples, the third-party service provider resource usage record may indicate that a client device and/or a user associated therewith maintains a user account corresponding to the third-party service provider. In some examples, the usage record may have associated therewith an access token corresponding to an authorized use of the third-party service provider resource by the user. The third-party service provider identifiers may be maintained, updated, and stored to a third-party resource usage map comprising a plurality of third-party service provider resource usage records by a group-based communication server.

As indicated at Block 530, the group-based communication server 106 may be configured to determine a subset of objects associated with the one or more call objects to be provided based on a set rules associated with the third-party service provider resource. The set of rules may include a set of rules defining conditions (i.e., logic for making selections) for forwarding call objects to a third-party service provider resource. In some examples, set of rules may include various sets of rules associated with a voice command associated with a third-party service provider resource. In some examples, the voice command may be a distinct voice command that corresponds to the third-party service provider resource.

As indicated at Block 540, the group-based communication server 106 may be configured to transmit the subset of objects to a computing device associated with the third-party service provider. In some examples, the group-based communication server 106 may send the subset of objects based at least in part on the third-party service provider identifier.

In some examples, the group-based communication server 106 may, based on the voice command, transmit a third-party resource access request to a third-party resource. A third-party resource access request may include an electronically generated request from a client device for access to a third-party resource integrated in a group-based communication channel within a group-based communication system. A third-party resource access request may include a user identifier and a third-party resource provider identifier to identify the user associated with the client device and the third-party resource the client device would like to access.

One or more of the call objects may be used to parse one or more third-party resource access tokens. Third-party resource access tokens may include a set of security credentials associated with one or more third-party resource providers for authenticating a user's identity in a group-based communication system. The third-party resource access tokens are used for granting a client device access to the one or more third-party resources served by the third-party resource providers. In one example, a third-party resource access token may include a cryptic string that is issued to a group-based communication server by an authentication server with an approval of a third-party resource provider. The group-based communication server may send a third-party user account creation request along with a third-party resource access token to a third-party resource provider for creating a third-party user account on behalf of a client device. In such an example, the third-party resource provider may grant a third-party user account creation approval after the authentication server verified the third-party resource access token.

In some examples, the group-based communication server 106 may send a third-party resource access token to a third-party resource provider on behalf of the client device. In such examples, the third-party resource provider may grant the client device access to the third-party resource after the authentication server verified the third-party resource access token. In some examples, the group-based communication server may send a third-party resource access token based at least in part on receiving a resource access request from the client device and/or determining that a third-party user account has been created on behalf of the client device.

In some examples, based at least in part on receiving a resource access request from the client device and/or determining that a third-party user account has not been created on behalf of the client device, the group-based communication server 106 may send a third-party user account creation request along with a third-party resource access token to a third-party resource provider on behalf of the client device. In such an example, the third-party resource provider may grant a third-party user account approval after the authentication server verified the third-party resource access token.

Figure 6:
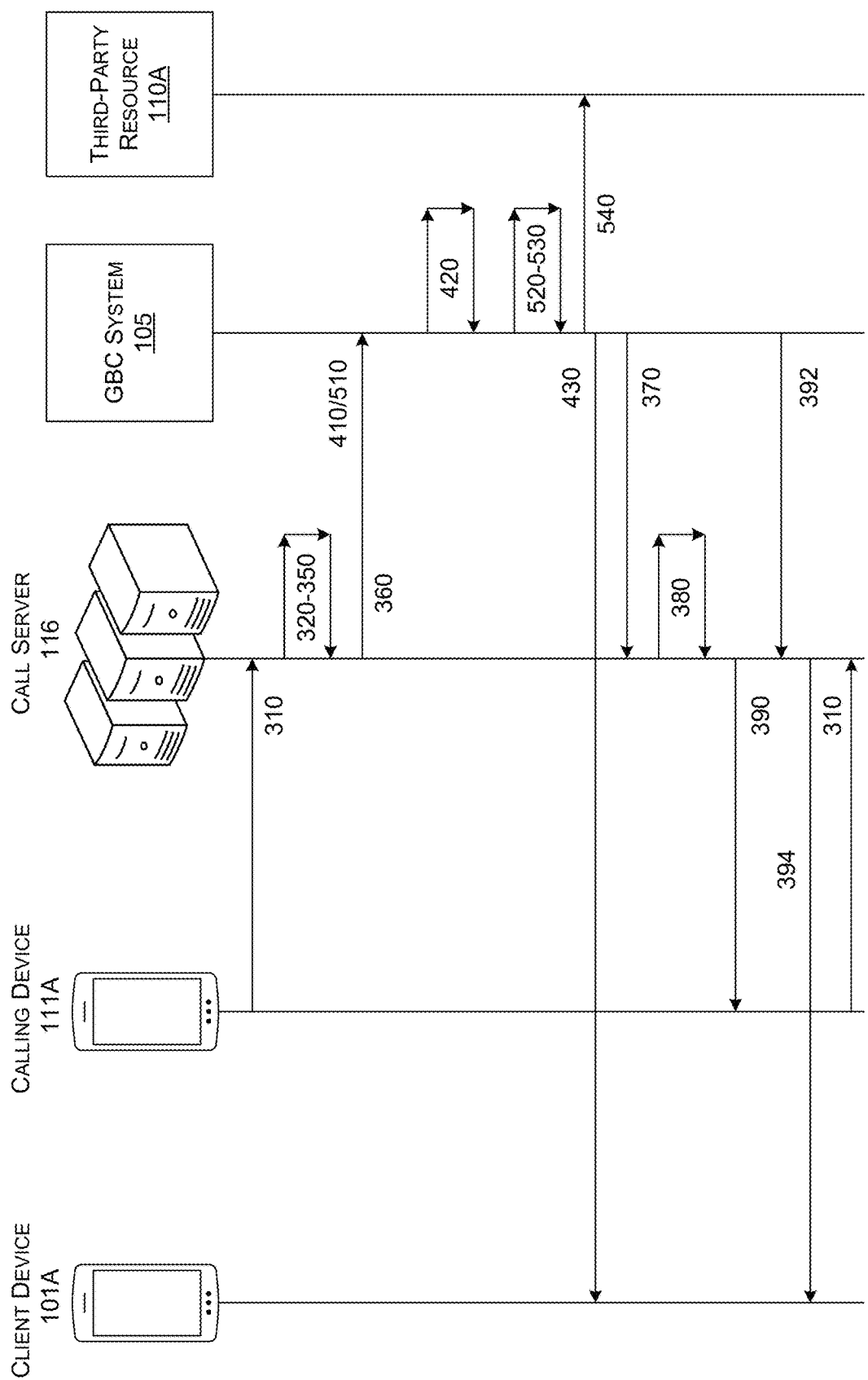
FIG. 6 illustrates example signal flows between various computing entities according to various examples of the present disclosure.

FIG. 6 illustrates exemplary signal flow between the client device 101A, the calling device 111A, the call server 116, third party resource 110A and the group-based communication (GBC) system 105 including the group-based communication server 106 and group-based communication repository 107 in accordance with some examples.

At Block 310, the call server 116 may be configured to receive a call-based channel communication request from a calling device 111A. In some examples, a calling device 111A may be associated with a client device 101A and/or a user identifier associated with the client device 101A and the group-based communication system 105. In some examples, a calling device 111A is not associated with a client device 101A or a user identifier associated with the group-based communication system 105.

At (optional) Block 320, the call server 116 may be configured to identify a group-based communication channel identifier based on the call-based channel communication request. A group-based communication channel identifier may include one or more items of data by which a group-based communication channel may be uniquely identified by a group-based communication system. For example, a group-based communication channel identifier may comprise American Standard Code for Information Interchange (ASCII) text, a pointer, a memory address, and the like.

In some examples, the call server 116 may be configured to identify the group-based communication channel identifier based on the call-based channel communication request directly. For example, the call server 116 may receive an indication of the group-based communication channel identifier via SMS or via voice or number dial in call. In some examples, the call server 116 may identify the group-based communication channel identifier by identifying the call server telephone number associated with the call server that the call-based channel communication communicated with.

In some examples, the call server telephone number is uniquely associated with one particular group-based communication channel identifier. Therefore, by identifying the call server telephone number associated with the call server with which the call-based channel communication is associated, the call server 116 can identify the group-based communication channel identifier by querying the telephone number-channel identifier association repository that stores pre-defined associations of call server telephone numbers and group-based communication channel identifiers.

In some examples, one or more call server telephone numbers are not uniquely associated with a group-based communication channel identifier, but uniquely associated with a workspace identifier. In some examples, an additional call server telephone number may be associated with the call server 116 and not associated with any identifier of the group-based communication system.

At (optional) Block 330, the call server 116 may be configured to extract call-based communication metadata associated with the call-based channel communication request. Call-based communication metadata is metadata associated with a call-based communication such as the telephone number associated with the calling device (e.g., sending device telephone number), the destination telephone number, a timestamp associated with the call-based communication, duration of the call-based communication in circumstances where the call-based communication is a telephone-call, International Mobile Subscriber Identity (IMSI) number associated with the calling device, International Mobile station Equipment Identity (IMEI) number associated with the calling device, trunk identifiers, or other metadata associated with the call-based communication.

In some examples, portions of the call-based communication metadata may be extracted as calling device identification information. Calling device identification information may include identifiers that may be used to uniquely identify a calling device such as, for example, identifiers associated with a telephone number such as the telephone number itself, the IMSI number, or the like, and/or equipment identifiers such as the IMEI number or the like. In some examples, the call server 116 may use the calling device identification information to verify that the calling device is defined to have access to the group-based communication channel identifier before transmitting the one or more call objects to the group-based communication server.

At Block 340, the call server 116 may be configured to generate one or more call-based communication action event data structures based on the call-based channel communication request.

At Block 350, the call server 116 may be configured to generate one or more call objects based at least in part on the group-based communication channel (e.g., identifier) and the one or more call-based communication action event data structures. In some examples, the call server 116 is further configured to generate the one or more call objects based on the call-based communication metadata. The call object(s) may include data generated by a call server based on a call-based communication from a calling device and subsequently transmitted from the call server to a group-based communication server. In various examples, the call object(s) may include a call-based communication action event data structure, call-based communication metadata, and other data generated by a call server 116.

At Block 360, the call server 116 may be configured to send the one or more call objects to a group-based communication server computing device. In some examples, as later detailed in FIG. 3B and associated descriptions, the call server 116 may take certain actions before transmitting the one or more call objects to the group-based communication server.

At Blocks 410 and 510, the group-based communication server 106 may be configured to receive one or more call objects from the call server 116. In some examples, the one or more call objects comprises one or more call-based communication action event data structures and a group-based communication channel identifier. In some examples, the one or more call-based communication action event data structures may comprise one or more group-based communication messages.

At Block 420, the group-based communication server 106 may be configured to optionally parse the call-based communication metadata in the one or more call objects to determine that the calling device is associated with a user identifier that has access to the group-based communication channel. In some examples, the group-based communication server 106 may determine that the calling device is authorized to access the group-based communication channel identified by the group-based communication channel identifier. The group-based communication server 106 may be configured to determine that the calling device is authorized to access the group-based communication channel identified by the group-based communication channel identifier by comparing the calling device identification information for the calling device (e.g., calling device data) with pre-defined authorized calling device information (e.g., authorized calling device data) to determine that the calling device is authorized.

In various examples, the group-based communication server 106 may determine that the calling device is authorized based on a match between the calling device data and the authorized calling device data. In various examples, the calling device data and the authorized calling device data may be determined to match based on a determination that a difference between the calling device data and the authorized calling device data is less than a threshold difference. In some examples, the pre-defined authorized calling device information may be stored in the group-based communication repository 107 and/or another database associated with the group-based communication server 106.

At Block 520, the group-based communication server 106 may be configured to parse the one or more voice command data structures to identify that one or more voice commands represented by the one or more voice command data structures are associated with one or more third-party resource provider identifiers.

At Block 530, the group-based communication server 106 may be configured to determine a subset of objects in the one or more call objects to be provided based on a set of third-party forwarding rules. The third-party forwarding rules are a set of rules defining conditions (i.e., logic for making selections) for forwarding call objects to a third-party resource provider. In some examples, third-party forwarding rules may include various sets of rules associated with a voice command associated with a third-party resource provider. In some examples, the voice command may be a distinct voice command that corresponds to the third-party resource provider.

At Block 540, the group-based communication server 106 may be configured to transmit the subset of objects to the third-party resource 110A associated with a third-party resource provider identifiers.

At Block 430, the group-based communication server 106 may be configured to send the one or more group-based communication messages for rendering within a group-based communication interface to the client device 101A associated with the group-based communication channel identifier.

At Block 370, the call server 116 may be configured to receive, from the group-based communication server 106, one or more group-based communication messages associated with a group-based communication interface associated with the group-based communication channel identifier. The one or more group-based communication messages may be received as standalone group-based communication messages or a channel message corpus.

At Block 380, the call server 116 may be configured to generate a textual or voice fragment representing the one or more group-based communication messages. If the call-based communication is a call, the call server 116 may generate a voice fragment. If the call-based communication is a SMS, the call server 116 may generate a textual fragment.

At Block 390, the call server 116 may be configured to transmit the textual or voice fragment representing the one or more group-based communication messages via the call-based communication to the calling device 111A. In some examples, the call server 116 may transmit the voice fragment via telecommunication signal encoding speech data incorporating the voice fragment via a telephone communications network to the calling device 111A. In some examples, the call server 116 may transmit the textual fragment via a SMS incorporating the text fragment via a telephone communications network to the calling device 111A.

At Block 392, the call server 116 may be configured to receive, from the group-based communication server 106, one or more join call requests associated with one or more client devices associated with the group-based communication interface that rendered the group-based communication channel identified by the group-based communication channel identifier.

At Block 394, the call server 116 may be configured to cause the client device 101A to have access to the call-based communication. In some examples, the call server 116 may be configured to cause the client device 101A to have access to the call-based communication by dialing one or more telephone numbers associated with the client device 101A that allow the client device 101A to join the call-based communication via telephone communication. In some examples, the call server 116 may be configured to cause the client device 101A to have access to the call-based communication by causing the transmitting a link for joining the call-based communication to the group-based communication server 106, which may be rendered by the client device 101A and may be interactable to join the call-based communication by a user.

At Block 310, the call server 116 may be configured to receive a second call-based channel communication request from a calling device. The second call-based channel communication request may include a second message to be rendered (e.g., published or otherwise presented to a user) via a designated communication channel (e.g., interface associated therewith), such as that described above.

Conclusion

Many modifications and other examples will come to mind to one skilled in the art to which this disclosure pertains having the benefit of the teachings presented in the foregoing descriptions and the associated drawings. Therefore, it is to be understood that the disclosure is not to be limited to the specific examples disclosed and that modifications and other examples are intended to be included within the scope of the appended claims. Although specific terms are employed herein, they are used in a generic and descriptive sense only and not for purposes of limitation.

That which is claimed is:

1. A call server computing device comprising:
one or more processors; and
computer readable media storing instructions that, when executed, cause the call server computing device to perform operations comprising:
receiving, from a calling device associated with a first user of a communication platform having a plurality of communication channels associated with different sets of users of the communication platform, a request to send a call-based communication to a second user of the communication platform based at least in part on selection, by the first user, of a user interface element presented via a communication channel of the plurality of communication channels;
determining that the first user is included in a predefined set of users that is authorized to access the communication channel and the second user is absent from the predefined set of users;
identifying that the calling device is associated with the communication channel based at least in part on a comparison between first data associated with the calling device and second data that identifies authorized calling devices that are authorized to place calls to the call server computing device within the communication channel;
in response to receiving the request and identifying that the calling device is associated with the communication channel, generating one or more call objects based at least in part on the communication channel; and
sending the one or more call objects to a group-based communication server computing device associated with the communication platform, wherein the one or more call objects cause a publication of the call-based communication via the communication channel.

2. The call server computing device of claim 1, the operations further comprising:
identifying, based at least in part on metadata associated with the request, calling device data associated with the calling device;
comparing the calling device data to authorized calling device data stored in a datastore to determine whether the calling device is authorized to communicate via the communication platform,
wherein identifying that the calling device is associated with the communication channel is based at least in part on a determination that the calling device is authorized to communicate via the communication platform.

3. The call server computing device of claim 2, wherein the calling device data comprises:
an equipment identifier associated with the calling device.

4. The call server computing device of claim 1, the operations further comprising:
receiving, from the group-based communication server computing device, a message associated with the communication channel;
generating a textual fragment or a voice fragment representing the message; and
transmitting the textual fragment or the voice fragment representing the message to the calling device.

5. The call server computing device of claim 1, the operations further comprising:
receiving a signal representing speech data that is associated with the call-based communication;
transcribing the signal to identify an action event representation; and
generating an action event data structure based at least in part on the action event representation, wherein the action event representation comprises one or more voice fragments to be converted to text and rendered as a message via the communication channel.

6. The call server computing device of claim 1, the operations further comprising:
receiving, from the group-based communication server computing device, a join call request originating from a client device, wherein the client device is associated with the communication channel and the join call request comprises a request to join the call-based communication; and providing the client device with access to the call-based communication, wherein providing the client device with access to the call-based communication comprises:
sending, to the group-based communication server computing device, a link associated with the call-based communication to be rendered on the client device, wherein the link enables the client device to access the call-based communication; or
generating a first connection between the call server computing device and the client device, the first connection being based at least in part on a telephone number associated with client device; and
linking the first connection to a second connection between the call server computing device and the calling device, the second connection being representative of the call-based communication.

7. The call server computing device of claim 1, wherein the call-based communication comprises a text message, the operations further comprising:
receiving a signal representing textual data that is associated with the call-based communication;
parsing the text message to determine one or more textual fragments to be rendered on a client device, the client device being associated with the communication channel; and
generating an action event data structure based at least in part on the one or more textual fragments.

8. A method, implemented at least in part by a call server computing device, comprising:
receiving, from a calling device associated with a first user of a communication platform having a plurality of communication channels associated with different sets of users of the communication platform, a request to send a call-based communication to a second user of the communication platform based at least in part on selection, by the first user, of a user interface element presented via a communication channel of the plurality of communication channels;
determining that the first user is included in a predefined set of users that is authorized to access the communication channel and the second user is absent from the predefined set of users;
identifying that the calling device is associated with the communication channel based at least in part on a comparison between first data associated with the calling device and second data that identifies authorized calling devices that are authorized to place calls to the call server computing device within the communication channel;
in response to receiving the request and identifying that the calling device is associated with the communication channel, generating one or more call objects based at least in part on the communication channel; and
sending the one or more call objects to a group-based communication server computing device associated with the communication platform, wherein the one or more call objects cause a publication of the call-based communication via the communication channel.

9. The method of claim 8, further comprising:
identifying, based at least in part on metadata associated with the request, calling device data associated with the calling device;
comparing the calling device data to authorized calling device data stored in a datastore to determine whether the calling device is authorized to communicate via the communication platform,
wherein identifying that the calling device is associated with the communication channel is based at least in part on a determination that the calling device is authorized to communicate via the communication platform.

10. The method of claim 8, further comprising:
receiving, from the group-based communication server computing device, a message associated with the communication channel;
generating a textual fragment or a voice fragment representing the message; and
transmitting the textual fragment or the voice fragment representing the message to the calling device.

11. The method of claim 8, further comprising:
receiving a signal representing speech data that is associated with the call-based communication;
transcribing the signal to identify an action event representation; and
generating an action event data structure based at least in part on the action event representation.

12. The method of claim 11, wherein the call-based communication comprises a text message, and wherein generating the action event data structure comprises:
receiving a signal representing textual data that is associated with the call-based communication;
parsing the text message to determine one or more textual fragments to be rendered on a client device, the client device being associated with the communication channel; and
generating the action event data structure based at least in part on the one or more textual fragments.

13. The method of claim 8, further comprising:
receiving, from the group-based communication server computing device, a join call request originating from a client device, wherein the client device is associated with the communication channel and the join call request comprises a request to join the call-based communication; and
performing at least one of:
sending, to the group-based communication server computing device, a link associated with the call-based communication to be rendered on the client device, wherein the link enables the client device to access the call-based communication; or
generating a first connection between the call server computing device and the client device, the first connection being based at least in part on a telephone number associated with client device; and
linking the first connection to a second connection between the call server computing device and the calling device, the second connection being representative of the call-based communication.

14. One or more non-transitory computer readable media storing computer-executable instructions that, when executed by one or more processors of a call server computing device, cause the call server computing device to perform operations comprising:
receiving, from a calling device associated with a first user of a communication platform having a plurality of communication channels associated with different sets of users of the communication platform, a request to send a call-based communication to a second user of the communication platform based at least in part on selection, by the first user, of a user interface element presented via a communication channel of the plurality of communication channels;

determining that the first user is included in a predefined set of users that is authorized to access the communication channel and the second user is absent from the predefined set of users;

identifying that the calling device is associated with the communication channel based at least in part on a comparison between first data associated with the calling device and second data that identifies authorized calling devices that are authorized to place calls to the call server computing device within the communication channel;

in response to receiving the request and identifying that the calling device is associated with the communication channel, generating one or more call objects based at least in part on the communication channel; and sending the one or more call objects to a group-based communication server computing device associated with the communication platform, wherein the one or more call objects cause a publication of the call-based communication via the communication channel.

15. The one or more non-transitory computer readable media of claim 14, the operations further comprising:

identifying, based at least in part on metadata associated with the request, calling device data associated with the calling device;

comparing the calling device data to authorized calling device data stored in a datastore to determine whether the calling device is authorized to communicate via the communication platform, wherein identifying that the calling device is associated with the communication channel is based at least in part on a determination that the calling device is authorized to communicate via the communication platform.

16. The one or more non-transitory computer readable media of claim 14, the operations further comprising:

receiving, from the group-based communication server computing device, a message associated with the communication channel;

generating a textual fragment or a voice fragment representing the message; and transmitting the textual fragment or the voice fragment representing the message to the calling device.

17. The one or more non-transitory computer readable media of claim 14, the operations further comprising:

receiving a signal representing speech data associated with the call-based communication;

transcribing the signal to identify an action event representation; and generating an action event data structure based at least in part on the action event representation.

18. The one or more non-transitory computer readable media of claim 14, wherein the call-based communication comprises a text message, the operations further comprising:

receiving a signal representing textual data that is associated with the call-based communication;

parsing the text message to determine one or more textual fragments to be rendered on a client device, the client device being associated with the communication channel; and generating an action event data structure based at least in part on the one or more textual fragments.

19. The call server computing device of claim 1, wherein the first data is telephone number of the calling device.

20. The call server computing device of claim 1, the operations further comprising:

determining, based at least in part on the comparison, a difference between the first data and the second data;

determining that the difference is less than or equal to a threshold amount; and determining that the calling device is included in the authorized calling devices based at least in part on the difference being less than or equal to the threshold amount.

* * * * *